(12) United States Patent
Lv et al.

(10) Patent No.: US 12,000,992 B2
(45) Date of Patent: Jun. 4, 2024

(54) OPTICAL IMAGING SYSTEM AND CAMERA DEVICE INCLUDING FIVE LENSES OF ++−+−, ++−−− or ++−−+ REFRACTIVE POWERS

(71) Applicant: Zhejiang Sunny Optical Co., Ltd, Yuyao (CN)

(72) Inventors: Saifeng Lv, Ningbo (CN); Fujian Dai, Ningbo (CN)

(73) Assignee: Zhejiang Sunny Optical Co., Ltd (CN)

( * ) Notice: Subject to any disclaimer, the term of this patent is extended or adjusted under 35 U.S.C. 154(b) by 46 days.

(21) Appl. No.: 17/833,802

(22) Filed: Jun. 6, 2022

(65) Prior Publication Data

US 2022/0308318 A1 Sep. 29, 2022

Related U.S. Application Data

(63) Continuation of application No. 16/076,191, filed as application No. PCT/CN2017/088355 on Jun. 15, 2017, now Pat. No. 11,402,611.

(30) Foreign Application Priority Data

Nov. 15, 2016 (CN) .......................... 201611030125.4

(51) Int. Cl.
G02B 13/00 (2006.01)
G02B 9/60 (2006.01)
(52) U.S. Cl.
CPC ........... *G02B 13/0045* (2013.01); *G02B 9/60* (2013.01)
(58) Field of Classification Search
CPC .............................. G02B 13/0045; G02B 9/60
See application file for complete search history.

(56) References Cited

U.S. PATENT DOCUMENTS

2012/0154929 A1 6/2012 Tsai et al.
2015/0002271 A1 1/2015 Huang
(Continued)

FOREIGN PATENT DOCUMENTS

CN 202102166 U 1/2012
CN 103777326 A 5/2014
(Continued)

*Primary Examiner* — Wen Huang
(74) *Attorney, Agent, or Firm* — Barnes & Thornburg LLP

(57) ABSTRACT

The present disclosure provides an optical imaging system and a camera device equipped with the optical imaging system. The optical imaging system includes sequentially, from an object side to an image side along an optical axis, a first lens having a positive refractive power, wherein an image-side surface of the first lens gradually changes from a paraxial concave surface to an edge convex surface as the image-side surface moves away from the optical axis; a second lens having a positive refractive power, wherein an object-side surface of the second lens is a convex surface, and an image-side surface of the second lens is a convex surface; a third lens having a negative refractive power; a fourth lens having a positive refractive power or a negative refractive power; and a fifth lens having a positive refractive power or a negative refractive power, wherein an object-side surface of the fifth lens is a convex surface at a paraxial position, and an image-side surface of the fifth lens is a concave surface at a paraxial position. A combined refractive power of the fourth lens and the fifth lens is a negative refractive power.

14 Claims, 39 Drawing Sheets

(56) References Cited

U.S. PATENT DOCUMENTS

| | | |
|---|---|---|
| 2015/0022714 A1 | 1/2015 | Huang |
| 2015/0103225 A1* | 4/2015 | Hsu .......................... G02B 9/60 |
| | | 348/335 |
| 2015/0103243 A1 | 4/2015 | Lin et al. |
| 2015/0241660 A1 | 8/2015 | Son |
| 2016/0091691 A1 | 3/2016 | Son |
| 2016/0349489 A1 | 12/2016 | Dai et al. |
| 2017/0176720 A1 | 6/2017 | Zhao et al. |
| 2018/0100993 A1* | 4/2018 | Park ................... G02B 13/0045 |
| 2021/0080692 A1 | 3/2021 | Kubota |

FOREIGN PATENT DOCUMENTS

| | | |
|---|---|---|
| CN | 104880804 A | 9/2015 |
| CN | 105988185 A | 10/2016 |
| CN | 106405796 A | 2/2017 |
| TW | 201326957 A | 7/2013 |
| WO | 2016003211 A1 | 1/2016 |

* cited by examiner

OPTICAL IMAGING SYSTEM AND CAMERA DEVICE INCLUDING FIVE LENSES OF ++−+−, ++−−−or ++−−+ REFRACTIVE POWERS

CROSS-REFERENCE TO RELATED APPLICATIONS

This application is a divisional application of U.S. patent application Ser. No. 16/076,191, filed on Aug. 7, 2018, which is a national stage of International Application No. PCT/CN2017/088355, filed on Jun. 15, 2017 and claims the priorities and rights from Chinese Patent Application No. 201611030125.4 filed with the State Intellectual Property Office of China (SIPO) on Nov. 15, 2016. The aforementioned applications are incorporated herein by reference in their entities.

TECHNICAL FIELD

The present disclosure relates to an optical imaging system and a camera device equipped with the optical imaging system.

BACKGROUND

The photosensitive element in a conventional electronic camera device is generally a CCD (charge-coupled device) or CMOS (complementary metal-oxide semiconductor). As the CCD and COMS elements are having higher performances and smaller sizes, higher requirements on miniaturization and high image quality of an optical imaging system equipped in the camera device have been brought forward.

To satisfy the miniaturization requirement, the Patent Application No. CN201310472840.3 provides an optical imaging system, which ensures that the optical imaging system has a good image quality and a shorter length. However, with the constant development of smart phones and other portable electronic products, higher requirements on the optical imaging system are brought forward, especially in situations such as lack of light (e.g., cloudy and rainy days, dusk, etc.) and hand trembling.

Therefore, there is a need for an optical imaging system applicable to the portable electronic products, having a large aperture, a good image quality and a low sensitivity.

SUMMARY

The technical solution provided by the present disclosure at least partially solves the technical problems described above.

According to an aspect, the present disclosure provides an optical imaging system. The optical imaging system includes sequentially, from an object side to an image side along an optical axis, a first lens having a positive refractive power, wherein an image-side surface of the first lens gradually changes from a paraxial concave surface to an edge convex surface as the image-side surface moves away from the optical axis; a second lens having a positive refractive power, wherein an object-side surface of the second lens is a convex surface, and an image-side surface of the second lens is a convex surface; a third lens having a negative refractive power; a fourth lens having a positive refractive power or a negative refractive power; and a fifth lens having a positive refractive power or a negative refractive power, wherein an object-side surface of the fifth lens is a convex surface at a paraxial position, and an image-side surface of the fifth lens is a concave surface at a paraxial position. A combined refractive power of the fourth lens and the fifth lens is a negative refractive power.

According to implementations of the present disclosure, an entrance pupil diameter EPD of the optical imaging system and a total effective focal length f of the optical imaging system satisfy: $f/EPD \leq 2.0$.

According to the implementations of the present disclosure, a spacing distance T34 between the third lens and the fourth lens on the optical axis and an axial distance TTL from an object-side surface of the first lens to an image plane of the optical imaging system satisfy: $T34/TTL<0.2$.

According to the implementations of the present disclosure, an effective focal length f1 of the first lens and the total effective focal length f of the optical imaging system satisfy: $0.3 \leq f/f1 \leq 0.5$.

According to the implementations of the present disclosure, an effective focal length f2 of the second lens and a radius of curvature R4 of the image-side surface of the second lens satisfy: $f2/|R4| \leq 0.6$.

According to the implementations of the present disclosure, a radius of curvature R5 of an object-side surface of the third lens and a radius of curvature R6 of an image-side surface of the third lens satisfy: $0<(R5-R6)/(R5+R6)<0.5$.

According to the implementations of the present disclosure, the radius of curvature R4 of the image-side surface of the second lens and the radius of curvature R5 of the object-side surface of the third lens satisfy: $-1.2<R5/R4<0$.

According to the implementations of the present disclosure, an abbe number V3 of the third lens and an abbe number V4 of the fourth lens satisfy: $|V3-V4| \leq 10$.

According to the implementations of the present disclosure, a radius of curvature R7 of an object-side surface of the fourth lens and the total effective focal length f of the optical imaging system satisfy: $f/|R7| \leq 0.6$.

According to the implementations of the present disclosure, a center thickness CT3 of the third lens and a center thickness CT4 of the fourth lens satisfy: $CT3/CT4 \leq 0.4$.

According to the implementations of the present disclosure, a combined focal length f12 of the first lens and the second lens and an effective focal length f3 of the third lens satisfy: $-0.5<f12/f3<0$.

According to the implementations of the present disclosure, a combined focal length f45 of the fourth lens and the fifth lens and the total effective focal length f of the optical imaging system satisfy: $-0.5<f/f45<0$.

According to another aspect, the present disclosure provides an optical imaging system. The optical imaging system includes sequentially, from an object side to an image side along an optical axis, a first lens assembly having a positive refractive power, a second lens assembly having a negative refractive power and at least one subsequent lens assembly. The first lens assembly includes a first lens and a second lens having positive refractive powers, the second lens assembly includes a third lens having a negative refractive power, and an image-side surface of the first lens gradually changes from a concave surface to a convex surface as the image-side surface moves away from the optical axis.

According to implementations of the present disclosure, a combined focal length f12 of the first lens and the second lens and an effective focal length f3 of the third lens satisfy: $-0.5<f12/f3<0$.

According to the implementations of the present disclosure, an object-side surface and an image-side surface of the second lens are convex surfaces.

According to the implementations of the present disclosure, an entrance pupil diameter EPD of the optical imaging system and a total effective focal length f of the optical imaging system satisfy: f/EPD≤2.0.

According to the implementations of the present disclosure, an effective focal length f1 of the first lens and the total effective focal length f of the optical imaging system satisfy: 0.3≤f/f1≤0.5.

According to the implementations of the present disclosure, an effective focal length f2 of the second lens and a radius of curvature R4 of the image-side surface of the second lens satisfy: f2/|R4|≤0.6.

According to the implementations of the present disclosure, a radius of curvature R5 of an object-side surface of the third lens and a radius of curvature R6 of an image-side surface of the third lens satisfy: 0<(R5−R6)/(R5+R6)<0.5.

According to the implementations of the present disclosure, the radius of curvature R4 of the image-side surface of the second lens and the radius of curvature R5 of the object-side surface of the third lens satisfy: −1.2<R5/R4<0.

According to the implementations of the present disclosure, the at least one subsequent lens assembly includes a third lens assembly having a negative refractive power, and the third lens assembly includes a fourth lens having a refractive power.

According to the implementations of the present disclosure, an abbe number V3 of the third lens and an abbe number V4 of the fourth lens satisfy: |V3−V4|≤10.

According to the implementations of the present disclosure, a radius of curvature R7 of an object-side surface of the fourth lens and the total effective focal length f of the optical imaging system satisfy: f/|R7|≤0.6.

According to the implementations of the present disclosure, a spacing distance T34 between the third lens and the fourth lens on the optical axis and an axial distance TTL from an object-side surface of the first lens to an image plane of the optical imaging system satisfy: T34/TTL<0.2.

According to the implementations of the present disclosure, a center thickness CT3 of the third lens and a center thickness CT4 of the fourth lens satisfy: CT3/CT4≤0.4.

According to the implementations of the present disclosure, the third lens assembly further includes a fifth lens having a refractive power. An object-side surface of the fifth lens is a convex surface at a paraxial position, and an image-side surface of the fifth lens is a concave surface at a paraxial position.

According to the implementations of the present disclosure, a combined focal length f45 of the fourth lens and the fifth lens and the total effective focal length f of the optical imaging system satisfy: −0.5<f/f45<0.

According to another aspect, the present disclosure provides a camera device equipped with the above optical imaging system.

The optical imaging system and the camera device provided by the present disclosure reduce aberrations of the edge field-of-view while increasing the amount of light admitted. In addition, by properly arranging the lenses, the positive refractive powers are dispersed, the excessive concentration of the refractive powers is avoided, and a spherical aberration and a longitudinal chromatic aberration may be effectively reduced at the same time.

BRIEF DESCRIPTION OF THE DRAWINGS

By reading detailed descriptions on non-limiting embodiments given with reference to the following accompanying drawings, other features, objectives and advantages of the present disclosure will become more apparent.

DETAILED DESCRIPTION OF EMBODIMENTS

Figure 1:
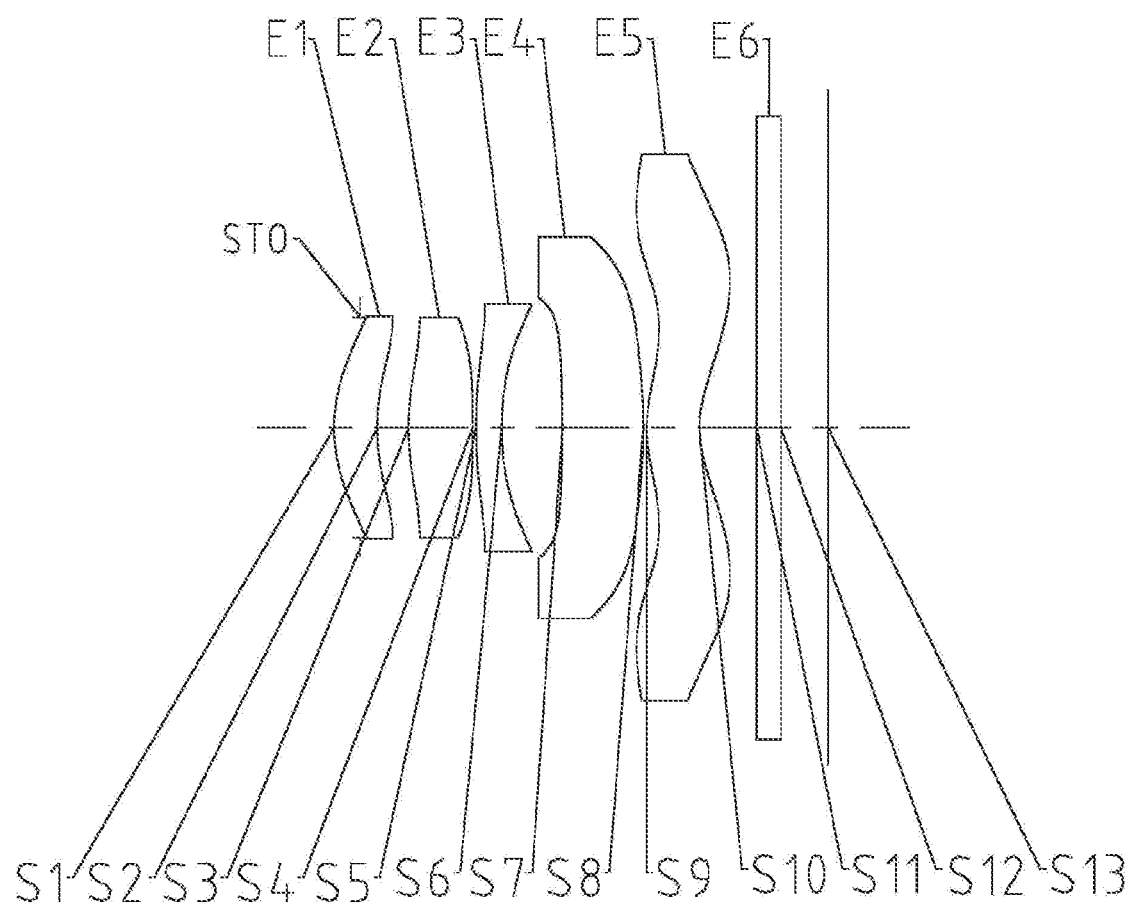
FIG. 1 is a schematic structural diagram illustrating an optical imaging system according to Embodiment 1 of the present disclosure.

The present disclosure will be further described below in detail in combination with the accompanying drawings and the embodiments. It may be appreciated that the specific embodiments described herein are merely used for explaining the relevant invention, rather than limiting the invention. In addition, it should be noted that, for the ease of description, only the parts related to the relevant invention are shown in the accompanying drawings.

It should be understood that in the present disclosure, when an element or layer is referred to as being "on," "connected to" or "coupled to" another element or layer, it may be directly on, connected to or coupled to another element or layer, or an intervening element or layer may be present. When an element is referred to as being "directly on," "directly connected to" or "directly coupled to" another element or layer, there are no intervening elements or layers. The same reference numerals designate the same elements throughout this specification. As used herein, the term "and/or" includes any and all combinations of one or more of the associated listed items.

It should be understood that, although the terms such as "first" and "second" may be used herein to describe various elements, components, areas, layers and/or sections, these elements, components, areas, layers and/or sections should not be limited by these terms. These terms are used to distinguish one element, component, area, layer or section from another element, component, area, layer or section. Thus, a first element, component, area, layer or section discussed below may be termed a second element, component, area, layer or section without departing from the teachings of the present disclosure.

Spatially relative terms, such as "beneath," "below," "lower," "above" and "upper" may be used herein for ease of description, to describe the relashipship of one element or feature to another element(s) or feature(s) as illustrated in the accompanying drawings. It should be understood that the spatially relative terms are also intended to encompass different orientations of the device in use or operation, in addition to the orientation depicted in the accompanying drawings. For example, if the device in the accompanying drawings is turned over, elements described as "below" or "beneath" other elements or features would then be oriented as "above" the other elements or features. Thus, the term "below" may encompass two orientations of above and below.

The terminology used herein is for the purpose of describing specific implementations only and is not intended to limit the present disclosure. As used herein, feature that are not limited to singular or plural forms are intended to include features in plural forms as well, unless the context clearly indicates otherwise. It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or combinations thereof. As used herein, the term "and/or" includes any and all combinations of one or more of the associated listed items. Expressions, such as "at least one of," when preceding a list of elements, modify the entire list of elements rather than an individual element in the list. In addition, the use of "may," when describing the implementations of the present disclosure, relates to "one or more implementations of the present disclosure." In addition, the term "exemplary" is intended to refer to an example or illustration.

As used herein, the terms "substantially," "about" and similar terms are used as a term of approximation and not as a term of degree, and are intended to account for the inherent deviations in measured or calculated values recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure will be further described below in combination with the specific embodiments.

Embodiment 1

First, an optical imaging system according to Embodiment 1 of the present disclosure is described with reference to FIGS. 1-2D.

FIG. 1 is a schematic structural diagram illustrating the optical imaging system according to Embodiment 1 of the present disclosure. The optical imaging system from an object side to an image side along an optical axis sequentially includes a first lens assembly having a positive refractive power, a second lens assembly having a negative refractive power and at least one subsequent lens assembly.

As shown in FIG. 1, the first lens assembly may include a first lens E1 and a second lens E2 having positive refractive powers. By setting the two lenses having positive refractive powers, it may help to disperse the positive refractive powers to avoid an excessive concentration of the refractive powers, and may effectively reduce spherochromatic aberrations and longitudinal chromatic aberrations at the same time. An image-side surface S2 of the first lens E1 may gradually change from a concave surface to a convex surface as the image-side surface moves away from the optical axis. Such a structure may reduce aberrations of the edge field-of-view while increasing the amount of light admitted.

The second lens assembly may include a third lens E3 having a negative refractive power. As shown in FIG. 1, an object-side surface S3 and an image-side surface S4 of the second lens in Embodiment 1 are convex surfaces.

A combined focal length f12 of the first lens E1 and the second lens E2 and an effective focal length f3 of the third lens E3 satisfy: $-0.5 < f12/f3 < 0$, for example, $-0.46 \leq f12/f3 \leq -0.32$, and in the present embodiment, $f12/f3 = -0.34$. By properly distributing the refractive powers of the two lenses, the aberrations of the entire system may be effectively reduced, and the sensitivity of the system may be effectively reduced. The setting of the focal length of each lens in the above lens assembly will be described below with reference to Table 3.

In the optical imaging system of Embodiment 1, the at least one subsequent lens assembly may include a third lens assembly having a negative refractive power. The third lens assembly may include a fourth lens E4 having a refractive power and a fifth lens E5 having a refractive power. An object-side surface S9 of the fifth lens E5 is a convex surface at a paraxial position, and an image-side surface S10 of the fifth lens E5 is a concave surface at a paraxial position.

Alternatively, the optical imaging system may further include an optical filter E6 having an object-side surface S11 and an image-side surface S12 to filter out infrared light. In the optical imaging system of this embodiment, an aperture STO may also be provided to adjust the amount of light admitted. Light from an object sequentially passes through the surfaces S1-S12 and finally forms an image on an image plane S13.

In this embodiment, at least one of the mirror surfaces S1-S10 is an aspheric mirror surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration, thus enabling the field-of-view to become larger and more realistic. The use of the aspheric lens can eliminate as much as possible the aberrations that occur during the imaging, thereby improving the image quality.

Table 1 shows the surface type, the radius of curvature, the thickness, the material and the conic coefficient of each lens of the optical imaging system in Embodiment 1.

TABLE 1

| surface number | surface type | radius of curvature | thickness | material | conic coefficient |
|---|---|---|---|---|---|
| OBJ | spherical | infinite | infinite | | |
| STO | spherical | infinite | −0.2268 | | |
| S1 | aspheric | 1.4577 | 0.3728 | 1.54, 56.1 | −7.4543 |
| S2 | aspheric | 1.8921 | 0.2712 | | −9.5668 |
| S3 | aspheric | 2.3515 | 0.5564 | 1.54, 56.1 | −16.2059 |
| S4 | aspheric | −11.0356 | 0.0300 | | −87.6338 |
| S5 | aspheric | 4.2108 | 0.2200 | 1.66, 20.4 | 12.1294 |
| S6 | aspheric | 2.3324 | 0.5281 | | −11.5902 |
| S7 | aspheric | −7.4438 | 0.7003 | 1.64, 23.5 | 13.3405 |
| S8 | aspheric | −6.6776 | 0.0300 | | −99.0000 |
| S9 | aspheric | 1.2572 | 0.4565 | 1.54, 56.1 | −5.5775 |
| S10 | aspheric | 0.9848 | 0.4953 | | −2.1314 |
| S11 | spherical | infinite | 0.2100 | 1.52, 64.2 | |
| S12 | spherical | infinite | 0.4095 | | |
| S13 | spherical | infinite | | | |

As may be obtained from Table 1, the radius of curvature R5 of the object-side surface S5 and the radius of curvature R6 of the image-side surface S6 of the third lens E3 satisfy: $0 < (R5-R6)/(R5+R6) < 0.5$, for example, $0.27 \leq (R5-R6)/(R5+R6) \leq 0.45$, and in this embodiment, $(R5-R6)/(R5+R6) = 0.29$. By properly allocating the radii of curvature of the two mirror surfaces of the third lens E3, it is helpful to correct the overall aberration of the system. In addition, the radius of curvature R4 of the image-side surface S4 of the second lens E2 and the radius of curvature R5 of the object-side surface S5 of the third lens E3 satisfy: −1.2<R5/R4<0, for example, −1.06≤R5/R4≤−0.35, and in this embodiment, R5/R4=−0.38. By properly allocating the adjacent mirror surfaces of the second lens E2 and the third lens E3, it may help to reduce the generation of the spherical aberrations and the astigmatism.

In this embodiment, as an example, five lenses are used. By properly distributing the focal length and the surface type of each lens, the aberrations of the optical imaging system are effectively reduced and an excellent resolution performance is achieved. Meanwhile, the miniaturization of the optical imaging system is ensured. The surface type of each mirror surface is defined by the following formula:

$$Z=ch^2/[1+(1-(1+k)c^2h^2)^{+1/2}]+A_4h^4+A_6h^6+A_8h^8+A_{10}h^{10}+A_{12}h^{12}+A_{14}h^{14}+A_{16}h^{16}.$$

Here, Z is the distance from the tangent plane to the vertex of the mirror surface, c is the paraxial curvature of the mirror surface, h is the height to the principal optical axis, k is the conic coefficient, and $A_4$-$A_{16}$ are corresponding high-order coefficients. Table 2 below shows the high-order coefficients $A_4$, $A_6$, $A_8$, $A_{10}$, $A_{12}$ and $A_{16}$ that may be applied to the mirror surfaces S1-S10 in Embodiment 1.

erly allocating the relationship between the effective focal length f1 of the first lens E1 and the total effective focal length f of the optical imaging system, it may help to shorten the total track length of the system, and simultaneously correct the spherical aberrations. According to Table 1 and Table 3, the effective focal length f2 of the second lens E2 and the radius of curvature R4 of the image-side surface S4 of the second lens E2 satisfy: f2/|R4|≤0.6, for example, f2/|R4|≤0.56, and in this embodiment, f2/|R4|=0.33. By properly allocating the effective focal length and the parameters of the mirror surface of the second lens E2, it may help to correct the spherical aberrations and the astigmatism, quickly correct paraxial aberrations, and improve the image quality of the center area. In addition, the radius of curvature R7 of the object-side surface S7 of the fourth lens E4 and the total effective focal length f of the optical imaging system satisfy: f/|R7|≤0.6, for example, f/|R7|≤0.59, and in this embodiment, f/|R7|=0.46.

By adjusting the radius of curvature of the object-side surface S7 of the fourth lens E4, edge aberrations of the system may be adjusted.

The total effective focal length f of the optical imaging system and the entrance pupil diameter EPD satisfy:

TABLE 2

| surface number | A4 | A6 | A8 | A10 | A12 |
| --- | --- | --- | --- | --- | --- |
| S1 | 2.5194E−01 | −3.3286E−01 | 2.9528E−01 | −1.7295E−01 | 5.4403E−03 |
| S2 | 1.0156E−01 | −1.9576E−01 | −1.2786E−01 | 6.9111E−01 | −1.2860E+00 |
| S3 | 8.4974E−02 | −2.0137E−01 | −7.6010E−02 | 6.1328E−01 | −1.4822E+00 |
| S4 | −9.9138E−02 | −1.3653E−01 | 6.3065E−01 | −1.5621E+00 | 1.9594E+00 |
| S5 | −7.8660E−02 | −4.9362E−02 | 2.7129E−01 | −3.2839E−01 | −3.6632E−02 |
| S6 | 1.4071E−01 | −2.5092E−01 | 6.1308E−01 | −9.7487E−01 | 9.7396E−01 |
| S7 | 1.4999E−01 | −3.1029E−01 | 1.3286E−01 | 7.0166E−01 | −2.2309E+00 |
| S8 | −1.6932E−01 | 4.7807E−01 | −7.4161E−01 | 6.6720E−01 | −3.8025E−01 |
| S9 | −3.4188E−01 | 3.6883E−01 | −3.3704E−01 | 2.0093E−01 | −7.2937E−02 |
| S10 | −3.4386E−01 | 3.1019E−01 | −2.1184E−01 | 1.0068E−01 | −3.2771E−02 |

| surface number | A14 | A16 | A18 | A20 |
| --- | --- | --- | --- | --- |
| S1 | −1.9388E−02 | 3.4376E−02 | 0 | 0 |
| S2 | 1.0939E+00 | −3.2669E−01 | 0 | 0 |
| S3 | 1.6365E+00 | −6.1561E−01 | 0 | 0 |
| S4 | −1.1603E+00 | 2.5963E−01 | 0 | 0 |
| S5 | 3.5251E−01 | −2.1625E−01 | 0 | 0 |
| S6 | −5.6426E−01 | 1.3724E−01 | 0 | 0 |
| S7 | 3.1095E+00 | −2.3347E+00 | 8.9539E−01 | −1.3593E−01 |
| S8 | 1.3811E−01 | −3.0798E−02 | 3.8211E−03 | −2.0104E−04 |
| S9 | 1.6239E−02 | −2.1810E−03 | 1.6288E−04 | −5.2101E−06 |
| S10 | 7.0891E−03 | −9.6065E−04 | 7.3094E−05 | −2.3702E−06 |

Table 3 below shows the effective focal lengths f1-f5 of the lenses, the total effective focal length f of the optical imaging system, the total track length TTL of the optical imaging system and the half of the field-of-view (diagonal) HFOV in Embodiment 1.

TABLE 3

| f1(mm) | 8.93 | f(mm) | 3.39 |
| --- | --- | --- | --- |
| f2(mm) | 3.60 | TTL(mm) | 4.28 |
| f3(mm) | −8.23 | HFOV(deg) | 41.1 |
| f4(mm) | 74.10 | | |
| f5(mm) | −20.40 | | |

According to Table 3, the effective focal length f1 of the first lens E1 and the total effective focal length f of the optical imaging system satisfy: 0.3≤f/f1≤0.5, for example, 0.34≤f/f1≤0.46, and in this embodiment, f/f1=0.38. By propf/EPD≤2.0, for example, in this embodiment, f/EPD=1.78. This may help to increase the amount of light admitted, to make the system have an advantage of large aperture, thereby enhancing the imaging effect in a dark environment.

In addition, the third lens E3 and the fourth lens E4 are configured to make their respective abbe numbers V3 and V4 satisfy: |V3−V4|≤10, for example, in this embodiment, |V3−V4|=3.10. By properly allocating the abbe numbers of the third lens E3 and the fourth lens E4, the chromatic aberrations may be effectively corrected, and the high-order aberrations may be effectively balanced, thereby improving the image quality.

In Embodiment 1, the spacing distance T34 between the third lens E3 and the fourth lens E4 on the optical axis and the axial distance TTL from the object-side surface S1 of the first lens E1 to the image plane S13 of the optical imaging system satisfy: T34/TTL<0.2, for example, T34/TTL≤0.18, and in this embodiment, T34/TTL=0.12. By properly arranging the spacing distance between the lenses and the total track length of the optical system, it may help to ease the trend of light at the edge of the system, reduce high-order aberrations, and simultaneously reduce the sensitivity of the system. In addition, the center thickness CT3 of the third lens E3 and the center thickness CT4 of the fourth lens E4 satisfy: CT3/CT4≤0.4, for example, CT3/CT4≤0.36, and in this embodiment, CT3/CT4=0.31. This may help to ensure the forming technology and the assembling stability of the lenses, and the fourth lens is used to remedy a correction effect of the high-order aberrations of the third lens. The combined focal length f45 of the fourth lens E4 and the fifth lens E5 and the total effective focal length f of the optical imaging system satisfy: −0.5<f/f45<0, for example, −0.39≤f/f45≤−0.12, and in this embodiment, f/f45=−0.12. This may help to allocate the refractive powers of the fourth lens and the fifth lens to reduce the tolerance sensitivity and maintain the miniaturization of the system.

Figure 2A:
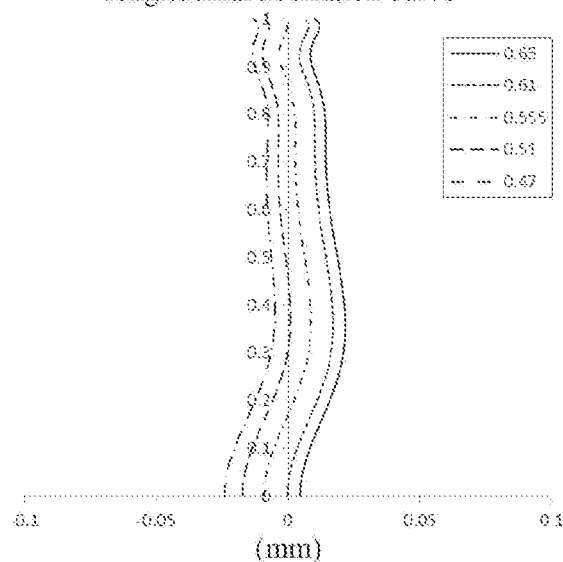
FIG. 2A illustrates a longitudinal aberration curve of the optical imaging system according to Embodiment 1.
Figure 2B:
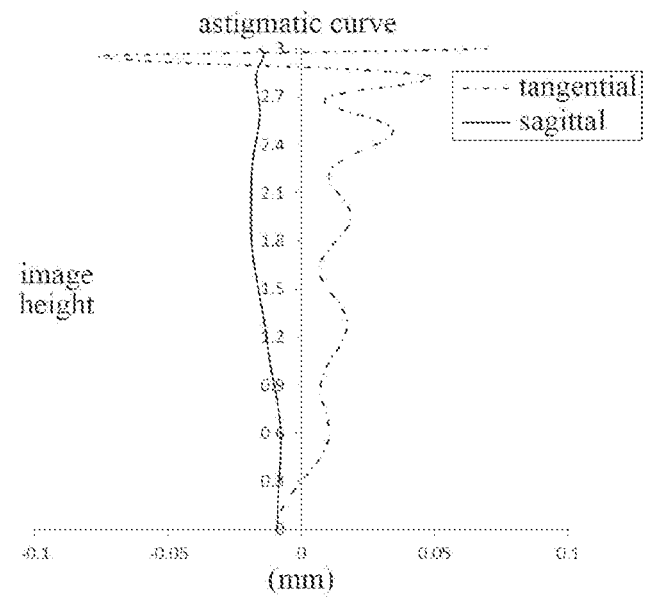
FIG. 2B illustrates an astigmatic curve of the optical imaging system according to Embodiment 1.
Figure 2C:
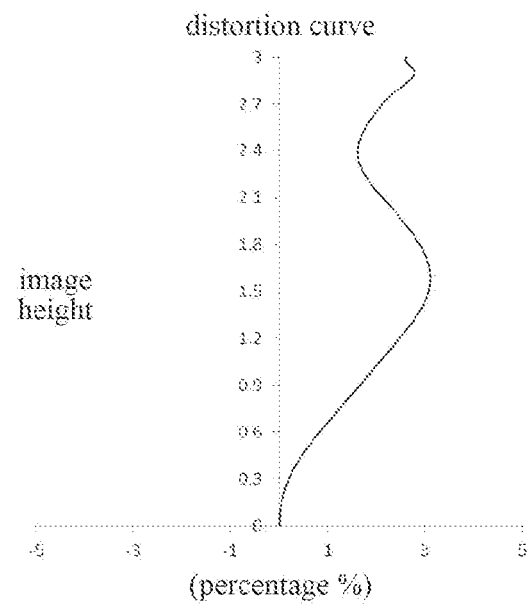
FIG. 2C illustrates a distortion curve of the optical imaging system according to Embodiment 1.
Figure 2D:
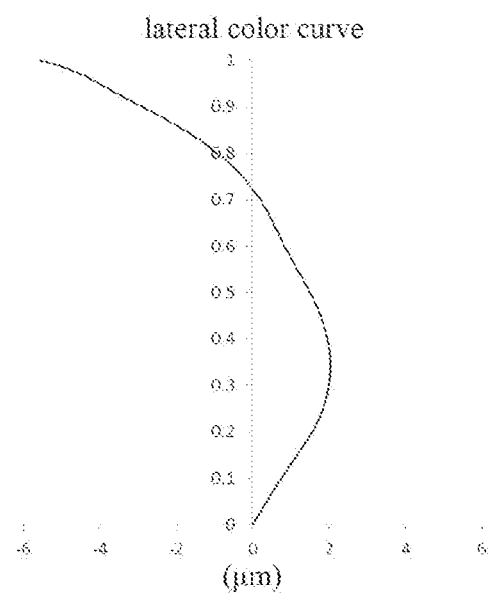
FIG. 2D illustrates a lateral color curve of the optical imaging system according to Embodiment 1.

FIG. 2A illustrates a longitudinal aberration curve of the optical imaging system according to Embodiment 1, representing deviations of focal points of light of different wavelengths converged after passing through an optical system. FIG. 2B illustrates an astigmatic curve of the optical imaging system according to Embodiment 1, representing a curvature of a tangential image plane and a curvature of a sagittal image plane. FIG. 2C illustrates a distortion curve of the optical imaging system according to Embodiment 1, representing amounts of distortion at different viewing angles. FIG. 2D illustrates a lateral color curve of the optical imaging system according to Embodiment 1, representing deviations of different image heights on an image plane after light passes through the optical imaging system. It can be seen according to FIGS. 2A-2D that the optical imaging system provided in Embodiment 1 achieves a good image quality.

Embodiment 2

Figure 3:
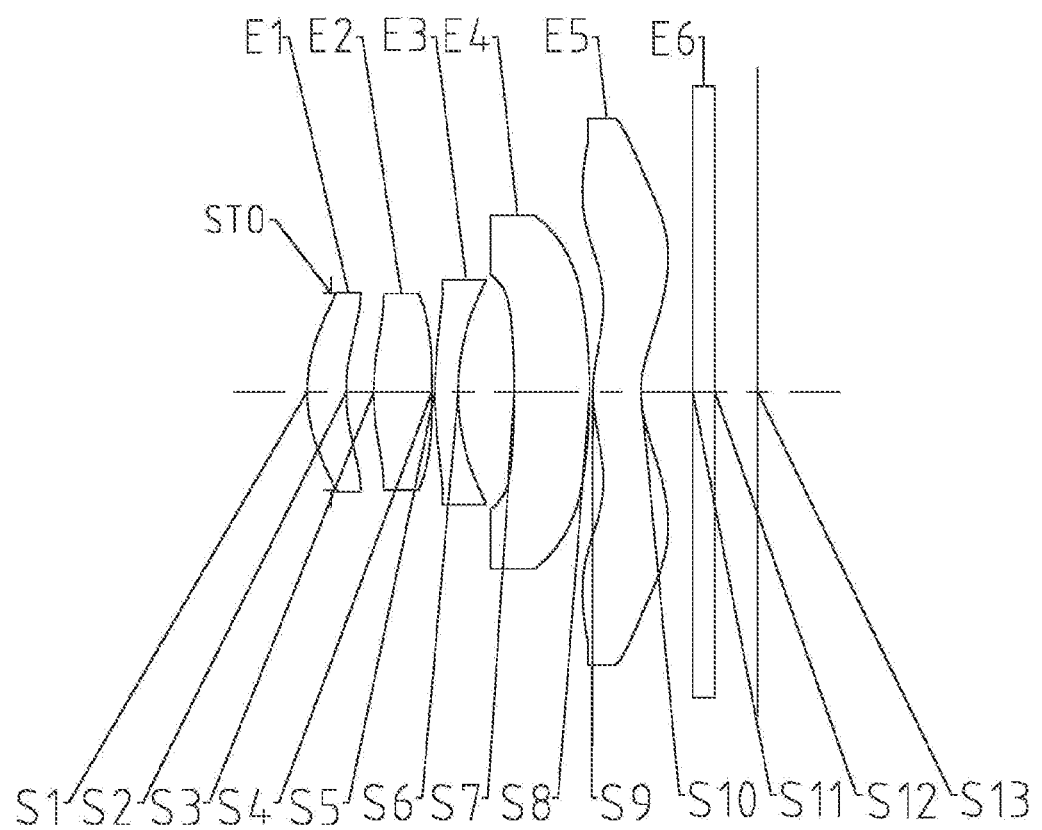
FIG. 3 is a schematic structural diagram illustrating an optical imaging system according to Embodiment 2 of the present disclosure.

An optical imaging system according to Embodiment 2 of the present disclosure is described below with reference to FIGS. 3-4D. In this embodiment and the following embodiments, the description of parts similar to those in Embodiment 1 will be omitted for the purpose of brevity. FIG. 3 is a schematic structural diagram illustrating the optical imaging system according to Embodiment 2 of the present disclosure.

As shown in FIG. 3, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 4 shows the surface type, the radius of curvature, the thickness, the material and the conic coefficient of each lens in Embodiment 2. Table 5 shows the high-order coefficients of each mirror surface in Embodiment 2. Table 6 shows the effective focal lengths f1-f5 of the lenses, the total effective focal length f of the optical imaging system, the total track length TTL of the camera lens and the half of the field-of-view HFOV in Embodiment 2.

TABLE 4

| surface number | surface type | radius of curvature | thickness | material | conic coefficient |
|---|---|---|---|---|---|
| OBJ | spherical | infinite | infinite | | |
| STO | spherical | infinite | −0.2262 | | |
| S1 | aspheric | 1.4398 | 0.3721 | 1.54, 56.1 | −7.1473 |
| S2 | aspheric | 1.8608 | 0.2603 | | −8.3408 |
| S3 | aspheric | 2.3367 | 0.5532 | 1.54, 56.1 | −16.2416 |
| S4 | aspheric | −11.6118 | 0.0300 | | −87.6338 |
| S5 | aspheric | 4.0466 | 0.2200 | 1.66, 20.4 | 10.6616 |
| S6 | aspheric | 2.3138 | 0.5312 | | −11.4443 |
| S7 | aspheric | −6.7506 | 0.7160 | 1.64, 23.5 | 13.3405 |
| S8 | aspheric | −5.9148 | 0.0300 | | −99.0000 |
| S9 | aspheric | 1.3147 | 0.4565 | 1.54, 56.1 | −4.8829 |
| S10 | aspheric | 1.0002 | 0.4933 | | −2.1594 |
| S11 | spherical | infinite | 0.2100 | 1.52, 64.2 | |
| S12 | spherical | infinite | 0.4074 | | |
| S13 | spherical | infinite | | | |

TABLE 5

| surface number | A4 | A6 | A8 | A10 | A12 |
|---|---|---|---|---|---|
| S1 | 2.5366E−01 | −3.4296E−01 | 3.7582E−01 | −4.0200E−01 | 3.4227E−01 |
| S2 | 8.5487E−02 | −1.4297E−01 | −2.8923E−01 | 1.0692E+00 | −1.8554E+00 |
| S3 | 8.4907E−02 | −2.1083E−01 | −1.0188E−01 | 7.5947E−01 | −1.8130E+00 |
| S4 | −1.4202E−01 | −3.0423E−02 | 3.7937E−01 | −1.1023E+00 | 1.4449E+00 |
| S5 | −1.0953E−01 | 4.3800E−02 | 2.3874E−03 | 2.8070E−01 | −8.6907E−01 |
| S6 | 1.4443E−01 | −2.5310E−01 | 6.0871E−01 | −9.6161E−01 | 9.7838E−01 |
| S7 | 1.3391E−01 | −2.6292E−01 | −8.2326E−02 | 1.3416E+00 | −3.4688E+00 |
| S8 | −1.5228E−01 | 3.8527E−01 | −5.8336E−01 | 5.0978E−01 | −2.8014E−01 |
| S9 | −3.5589E−01 | 3.6124E−01 | −3.1812E−01 | 1.8864E−01 | −6.8747E−02 |
| S10 | −3.3214E−01 | 2.8993E−01 | −1.9309E−01 | 8.9979E−02 | −2.8773E−02 |

| surface number | A14 | A16 | A18 | A20 |
|---|---|---|---|---|
| S1 | −2.7918E−01 | 1.1855E−01 | 0 | 0 |
| S2 | 1.5553E+00 | −4.6894E−01 | 0 | 0 |
| S3 | 2.0102E+00 | −7.6775E−01 | 0 | 0 |

TABLE 5-continued

| | | | | |
|---|---|---|---|---|
| S4 | −8.4179E−01 | 1.7435E−01 | 0 | 0 |
| S5 | 9.6881E−01 | −4.1343E−01 | 0 | 0 |
| S6 | −5.9028E−01 | 1.5023E−01 | 0 | 0 |
| S7 | 4.6191E+00 | −3.4479E+00 | 1.3398E+00 | −2.0830E−01 |
| S8 | 9.6825E−02 | −2.0090E−02 | 2.2378E−03 | −9.9999E−05 |
| S9 | 1.5392E−02 | −2.0781E−03 | 1.5587E−04 | −5.0030E−06 |
| S10 | 6.1284E−03 | −8.2002E−04 | 6.1780E−05 | −1.9882E−06 |

TABLE 6

| | | | |
|---|---|---|---|
| f1(mm) | 8.92 | f(mm) | 3.44 |
| f2(mm) | 3.63 | TTL(mm) | 4.28 |
| f3(mm) | −8.61 | HFOV(deg) | 40.8 |
| f4(mm) | 55.97 | | |
| f5(mm) | −15.72 | | |

Figure 4A:
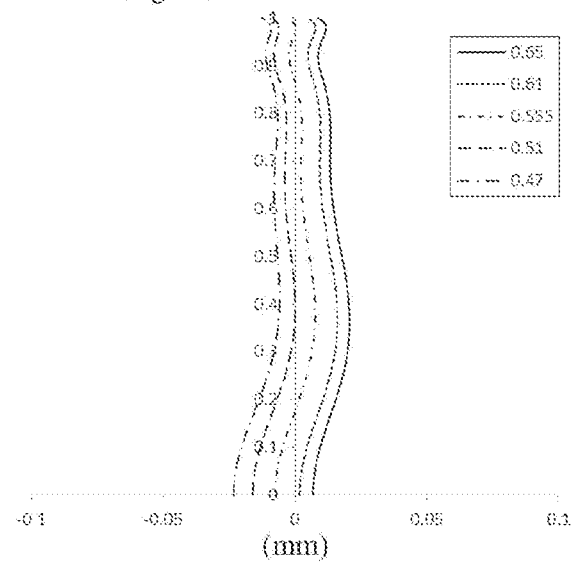
FIG. 4A illustrates a longitudinal aberration curve of the optical imaging system according to Embodiment 2.
Figure 4B:
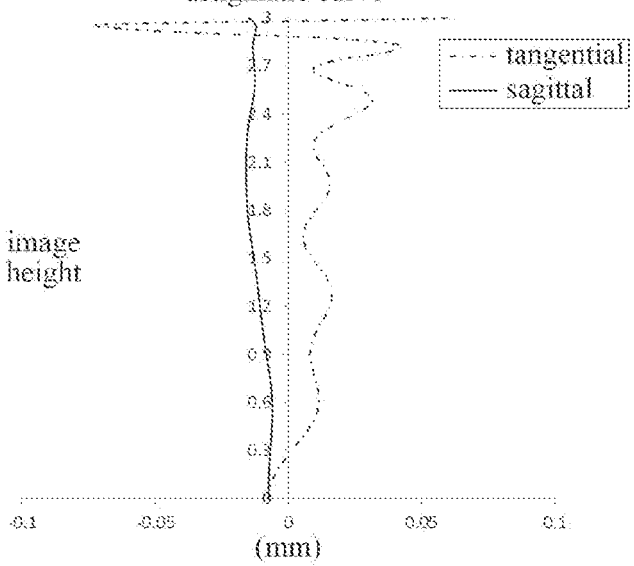
FIG. 4B illustrates an astigmatic curve of the optical imaging system according to Embodiment 2.
Figure 4C:
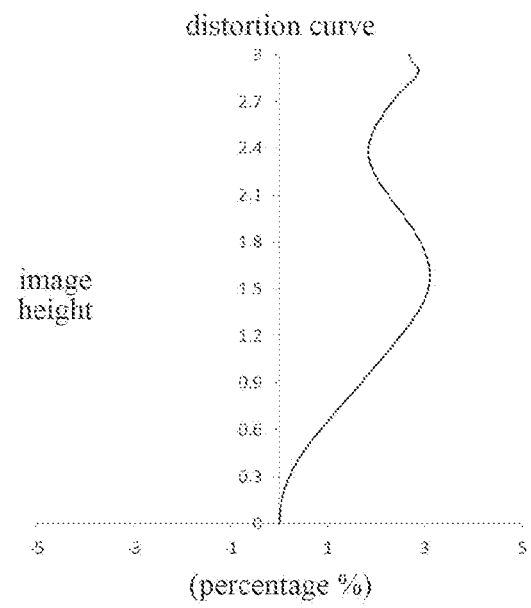
FIG. 4C illustrates a distortion curve of the optical imaging system according to Embodiment 2.
Figure 4D:
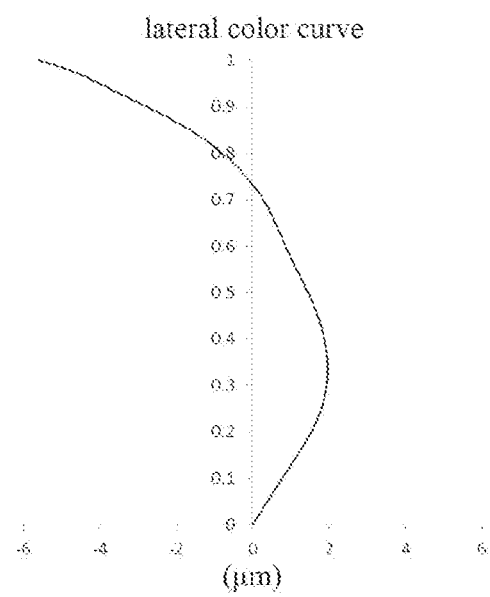
FIG. 4D illustrates a lateral color curve of the optical imaging system according to Embodiment 2.

FIG. 4A illustrates a longitudinal aberration curve of the optical imaging system according to Embodiment 2, representing deviations of focal points of light of different wavelengths converged after passing through an optical system. FIG. 4B illustrates an astigmatic curve of the optical imaging system according to Embodiment 2, representing a curvature of a tangential image plane and a curvature of a sagittal image plane. FIG. 4C illustrates a distortion curve of the optical imaging system according to Embodiment 2, representing amounts of distortion at different viewing angles. FIG. 4D illustrates a lateral color curve of the optical imaging system according to Embodiment 2, representing deviations of different image heights on an image plane after light passes through the optical imaging system. It can be seen according to FIGS. 4A-4D that the optical imaging system provided in Embodiment 2 achieves a good image quality.

Embodiment 3

Figure 5:
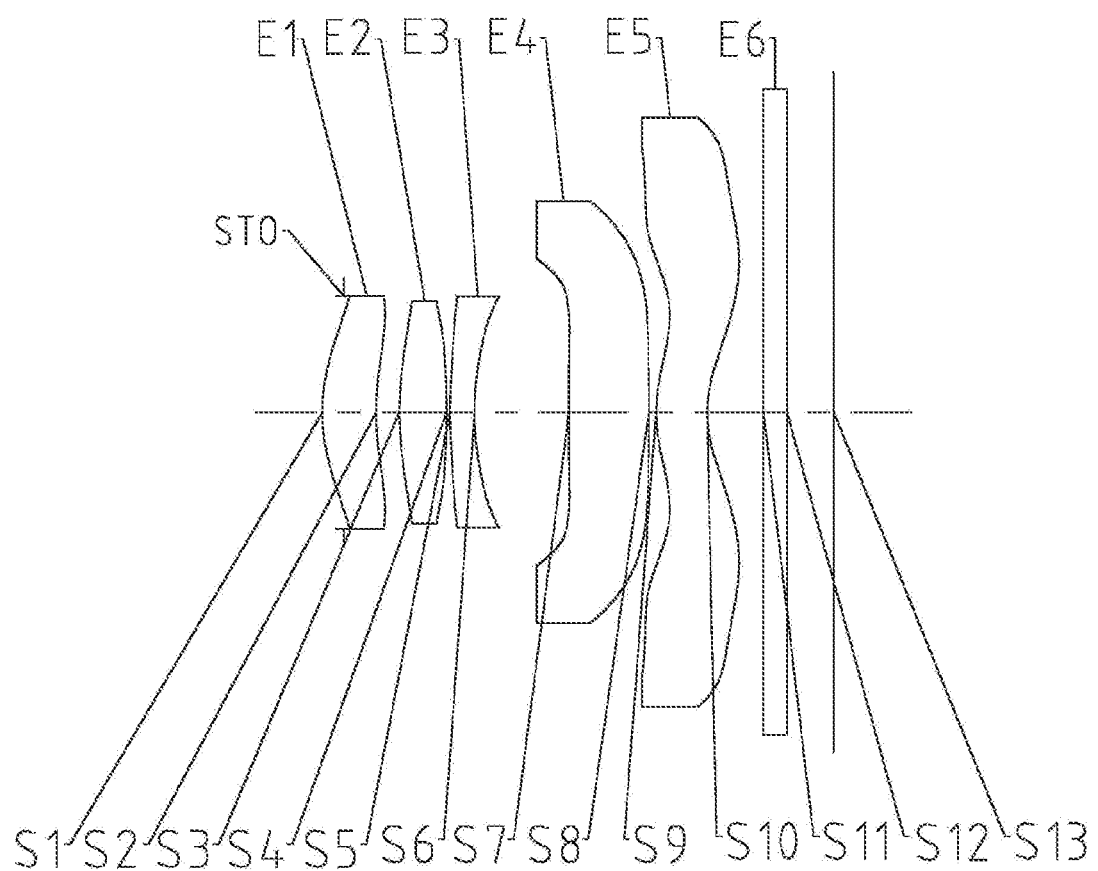
FIG. 5 is a schematic structural diagram illustrating an optical imaging system according to Embodiment 3 of the present disclosure.

An optical imaging system according to Embodiment 3 of the present disclosure is described below with reference to FIGS. 5-6D. FIG. 5 is a schematic structural diagram illustrating the optical imaging system according to Embodiment 3.

As shown in FIG. 5, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 7 shows the surface type, the radius of curvature, the thickness, the material and the conic coefficient of each lens in Embodiment 3. Table 8 shows the high-order coefficients of each mirror surface in Embodiment 3. Table 9 shows the effective focal lengths f1-f5 of the lenses, the total effective focal length f of the optical imaging system, the total track length TTL of the camera lens and the half of the field-of-view HFOV in Embodiment 3.

TABLE 7

| surface number | surface type | radius of curvature | thickness | material | conic coefficient |
|---|---|---|---|---|---|
| OBJ | spherical | infinite | infinite | | |
| STO | spherical | infinite | −0.1901 | | |
| S1 | aspheric | 1.7681 | 0.4815 | 1.54, 56.1 | −10.7358 |
| S2 | aspheric | 2.6721 | 0.2079 | | −15.9834 |
| S3 | aspheric | 3.0892 | 0.4246 | 1.54, 56.1 | −8.5047 |
| S4 | aspheric | −7.2494 | 0.0300 | | −87.6338 |
| S5 | aspheric | 5.6429 | 0.2200 | 1.66, 20.4 | 20.5288 |
| S6 | aspheric | 2.5886 | 0.8467 | | −22.9198 |
| S7 | aspheric | 349.0447 | 0.7162 | 1.64, 23.5 | 13.3405 |
| S8 | aspheric | infinite | 0.0656 | | −99.0000 |
| S9 | aspheric | 1.3290 | 0.4565 | 1.54, 56.1 | −5.6964 |
| S10 | aspheric | 1.0790 | 0.5066 | | −2.9875 |
| S11 | spherical | infinite | 0.2100 | 1.52, 64.2 | |
| S12 | spherical | infinite | 0.4209 | | |
| S13 | spherical | infinite | | | |

TABLE 8

| surface number | A4 | A6 | A8 | A10 | A12 |
|---|---|---|---|---|---|
| S1 | 1.9927E−01 | −2.8698E−01 | 2.4891E−01 | −1.2762E−01 | −4.8139E−02 |
| S2 | 4.5990E−02 | −1.4581E−01 | −6.2183E−02 | 2.2374E−01 | −2.4153E−01 |
| S3 | 2.6786E−02 | −6.6204E−02 | −2.9247E−02 | −2.2831E−01 | 5.6674E−01 |
| S4 | 7.7880E−02 | −4.2581E−01 | 4.8800E−01 | −1.4334E−01 | −1.2058E−01 |
| S5 | 3.2839E−03 | −1.9421E−01 | −2.5229E−01 | 1.6528E+00 | −2.4389E+00 |
| S6 | 1.0799E−01 | −9.7881E−02 | −2.1254E−01 | 9.7199E−01 | −1.3373E+00 |
| S7 | 5.3512E−02 | 1.1878E−02 | −5.0219E−01 | 1.3182E+00 | −1.9143E+00 |
| S8 | −7.4200E−02 | 2.1366E−01 | −3.9144E−01 | 3.9038E−01 | −2.4014E−01 |
| S9 | −1.8569E−01 | 1.1229E−01 | −1.6155E−01 | 1.3823E−01 | −6.1261E−02 |
| S10 | −1.4378E−01 | 5.7732E−02 | −2.2325E−02 | 8.2929E−03 | −2.4596E−03 |

| surface number | A14 | A16 | A18 | A20 |
|---|---|---|---|---|
| S1 | 7.8100E−02 | −2.1057E−02 | 0 | 0 |
| S2 | 1.6976E−01 | −5.0103E−02 | 0 | 0 |

TABLE 8-continued

| | | | | |
|---|---|---|---|---|
| S3 | −3.5727E−01 | 6.5732E−02 | 0 | 0 |
| S4 | 1.2486E−01 | −3.9529E−02 | 0 | 0 |
| S5 | 1.5817E+00 | −4.0509E−01 | 0 | 0 |
| S6 | 8.5158E−01 | −2.1203E−01 | 0 | 0 |
| S7 | 1.6777E+00 | −8.7882E−01 | 2.5046E−01 | −2.9571E−02 |
| S8 | 9.3205E−02 | −2.2200E−02 | 2.9583E−03 | −1.6865E−04 |
| S9 | 1.5488E−02 | −2.2824E−03 | 1.8358E−04 | −6.2497E−06 |
| S10 | 5.2056E−04 | −7.0351E−05 | 5.2660E−06 | −1.6387E−07 |

TABLE 9

| | | | |
|---|---|---|---|
| f1(mm) | 8.09 | f(mm) | 3.75 |
| f2(mm) | 4.04 | TTL(mm) | 4.59 |
| f3(mm) | −7.45 | HFOV(deg) | 38.4 |
| f4(mm) | 545.61 | | |
| f5(mm) | −29.55 | | |

Figure 6A:
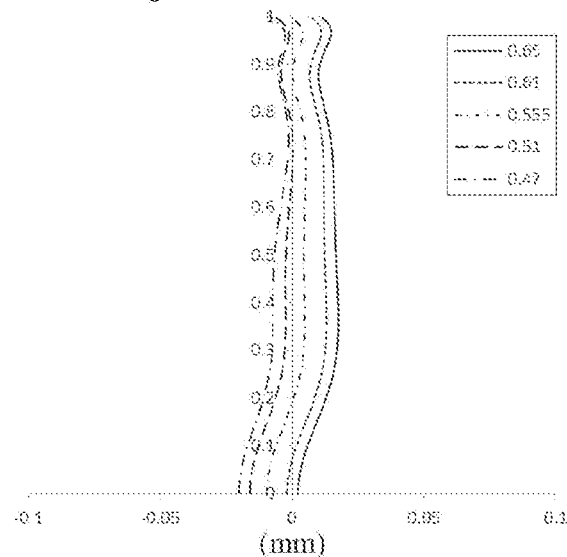
FIG. 6A illustrates a longitudinal aberration curve of the optical imaging system according to Embodiment 3.
Figure 6B:
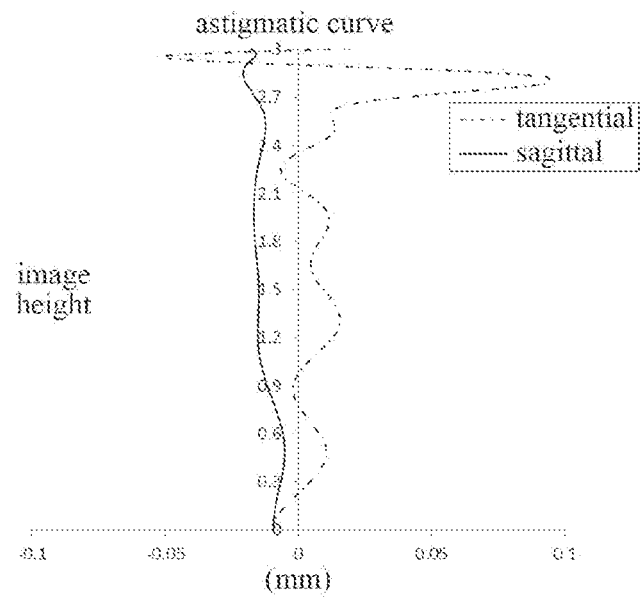
FIG. 6B illustrates an astigmatic curve of the optical imaging system according to Embodiment 3.
Figure 6C:
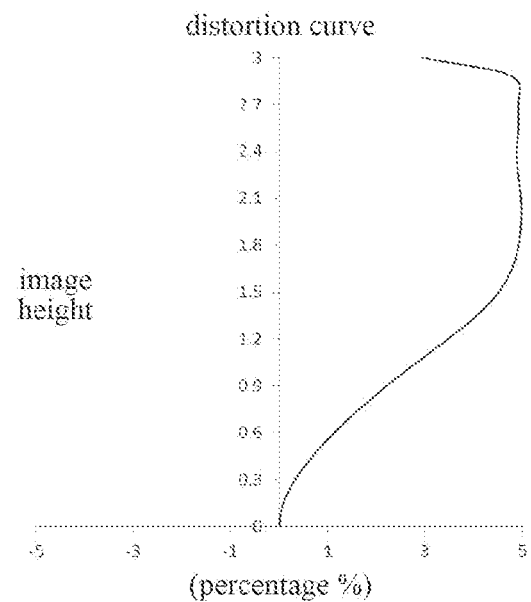
FIG. 6C illustrates a distortion curve of the optical imaging system according to Embodiment 3.
Figure 6D:
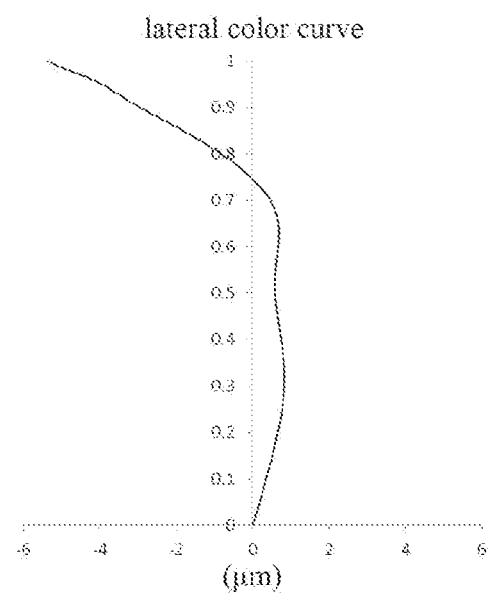
FIG. 6D illustrates a lateral color curve of the optical imaging system according to Embodiment 3.

FIG. 6A illustrates a longitudinal aberration curve of the optical imaging system according to Embodiment 3, representing deviations of focal points of light of different wavelengths converged after passing through an optical system. FIG. 6B illustrates an astigmatic curve of the optical imaging system according to Embodiment 3, representing a curvature of a tangential image plane and a curvature of a sagittal image plane. FIG. 6C illustrates a distortion curve of the optical imaging system according to Embodiment 3, representing amounts of distortion at different viewing angles. FIG. 6D illustrates a lateral color curve of the optical imaging system according to Embodiment 3, representing deviations of different image heights on an image plane after light passes through the optical imaging system. It can be seen according to FIGS. 6A-6D that the optical imaging system provided in Embodiment 3 achieves a good image quality.

Embodiment 4

Figure 7:
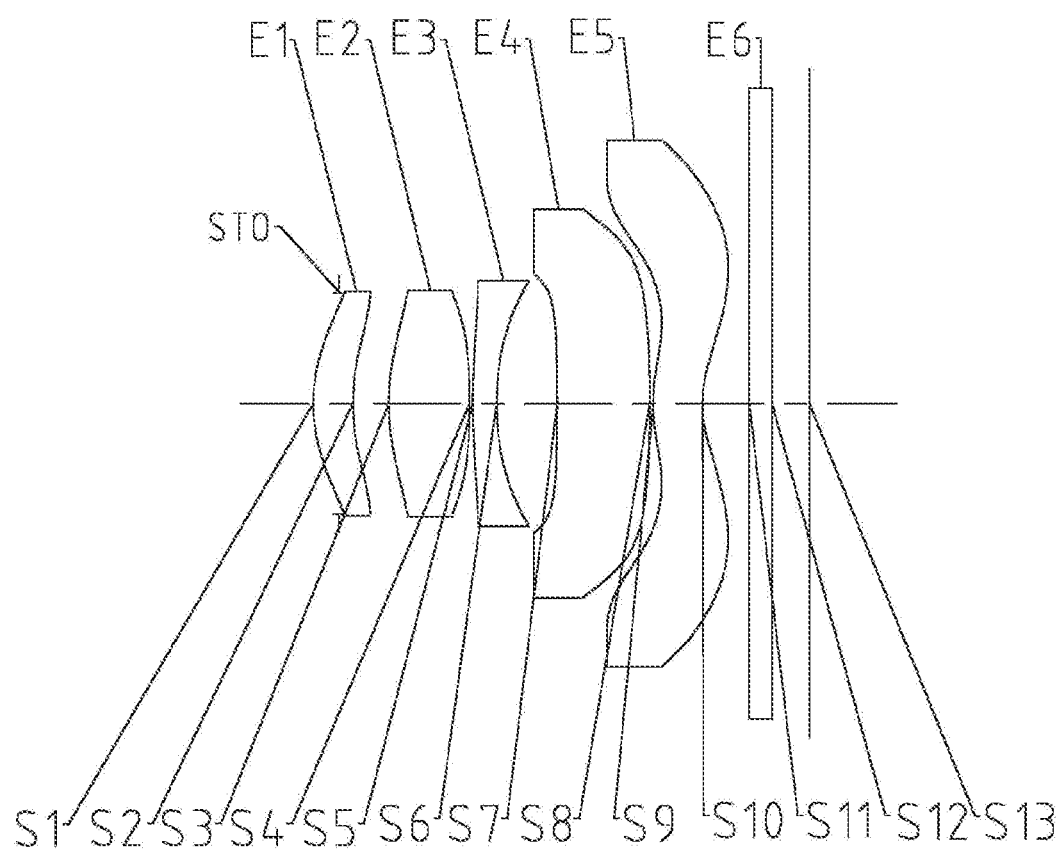
FIG. 7 is a schematic structural diagram illustrating an optical imaging system according to Embodiment 4 of the present disclosure.

An optical imaging system according to Embodiment 4 of the present disclosure is described below with reference to FIGS. 7-8D. FIG. 7 is a schematic structural diagram illustrating the optical imaging system according to Embodiment 4.

As shown in FIG. 7, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 10 shows the surface type, the radius of curvature, the thickness, the material and the conic coefficient of each lens in Embodiment 4. Table 11 shows the high-order coefficients of each mirror surface in Embodiment 4. Table 12 shows the effective focal lengths f1-f5 of the lenses, the total effective focal length f of the optical imaging system, the total track length TTL of the camera lens and the half of the field-of-view HFOV in Embodiment 4.

TABLE 10

| surface number | surface type | radius of curvature | thickness | material | conic coefficient |
|---|---|---|---|---|---|
| OBJ | spherical | infinite | infinite | | |
| STO | spherical | infinite | −0.2406 | | |
| S1 | aspheric | 1.5777 | 0.3665 | 1.54, 56.1 | −7.7312 |
| S2 | aspheric | 1.9840 | 0.3312 | | −7.6375 |
| S3 | aspheric | 2.1835 | 0.7463 | 1.54, 56.1 | −8.4304 |
| S4 | aspheric | −7.0115 | 0.0300 | | −87.6338 |
| S5 | aspheric | 6.0881 | 0.2200 | 1.66, 20.4 | 18.9638 |
| S6 | aspheric | 2.5129 | 0.5605 | | −12.6757 |
| S7 | aspheric | −15.2029 | 0.8568 | 1.64, 23.5 | 13.3405 |
| S8 | aspheric | −78.3903 | 0.0300 | | −99.0000 |
| S9 | aspheric | 1.3989 | 0.4565 | 1.54, 56.1 | −9.0401 |
| S10 | aspheric | 1.0720 | 0.4336 | | −2.2090 |
| S11 | spherical | infinite | 0.2100 | 1.52, 64.2 | |
| S12 | spherical | infinite | 0.3461 | | |
| S13 | spherical | infinite | | | |

TABLE 11

| surface number | A4 | A6 | A8 | A10 | A12 |
|---|---|---|---|---|---|
| S1 | 2.0832E−01 | −2.8777E−01 | 3.3430E−01 | −3.5100E−01 | 2.3471E−01 |
| S2 | 5.8790E−02 | −9.3000E−02 | −8.3264E−02 | 2.4904E−01 | −3.3114E−01 |
| S3 | 6.0329E−02 | −9.6545E−02 | −1.0330E−02 | 1.3952E−01 | −3.1951E−01 |
| S4 | −9.5909E−02 | −1.1665E−01 | 4.2196E−01 | −8.0938E−01 | 8.8250E−01 |
| S5 | −4.8018E−02 | −1.4908E−01 | 5.1044E−01 | −8.3444E−01 | 7.8591E−01 |
| S6 | 1.2274E−01 | −1.8613E−01 | 4.3063E−01 | −6.3683E−01 | 5.9202E−01 |
| S7 | 6.4058E−02 | −1.6739E−01 | 1.1116E−02 | 5.2896E−01 | −1.2973E+00 |
| S8 | −1.8559E−01 | 3.9974E−01 | −5.5907E−01 | 5.1278E−01 | −3.2673E−01 |
| S9 | −2.6660E−01 | 1.0796E−01 | 4.0381E−02 | −9.3402E−02 | 5.8864E−02 |
| S10 | −3.0715E−01 | 2.3589E−01 | −1.3468E−01 | 5.4606E−02 | −1.5879E−02 |

TABLE 11-continued

| surface number | A14 | A16 | A18 | A20 |
|---|---|---|---|---|
| S1 | −1.0216E−01 | 2.4546E−02 | 0 | 0 |
| S2 | 2.2239E−01 | −5.2153E−02 | 0 | 0 |
| S3 | 3.1965E−01 | −1.0296E−01 | 0 | 0 |
| S4 | −4.9062E−01 | 1.1241E−01 | 0 | 0 |
| S5 | −3.7949E−01 | 6.4978E−02 | 0 | 0 |
| S6 | −3.1057E−01 | 6.6826E−02 | 0 | 0 |
| S7 | 1.5222E+00 | −9.7520E−01 | 3.2014E−01 | −4.1674E−02 |
| S8 | 1.4055E−01 | −3.8524E−02 | 6.0212E−03 | −4.0512E−04 |
| S9 | −1.8936E−02 | 3.3742E−03 | −3.1750E−04 | 1.2337E−05 |
| S10 | 3.2327E−03 | −4.2879E−04 | 3.2561E−05 | −1.0564E−06 |

TABLE 12

| f1(mm) | 10.74 | f(mm) | 3.67 |
|---|---|---|---|
| f2(mm) | 3.15 | TTL(mm) | 4.59 |
| f3(mm) | −6.64 | HFOV(deg) | 39.0 |
| f4(mm) | −29.64 | | |
| f5(mm) | −16.61 | | |

Figure 8A:
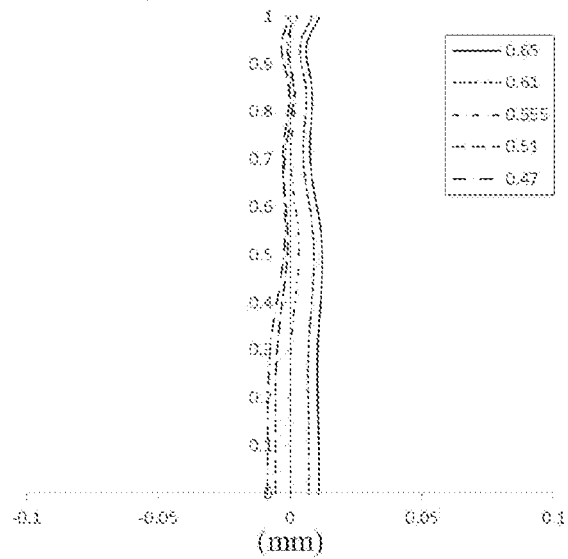
FIG. 8A illustrates a longitudinal aberration curve of the optical imaging system according to Embodiment 4.
Figure 8B:
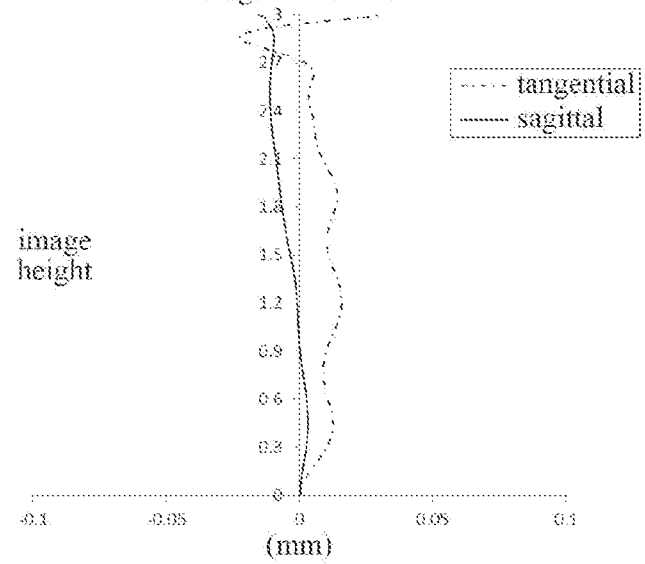
FIG. 8B illustrates an astigmatic curve of the optical imaging system according to Embodiment 4.
Figure 8C:
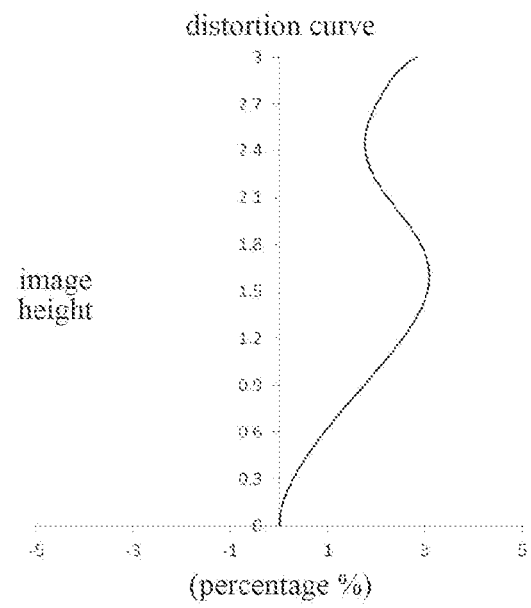
FIG. 8C illustrates a distortion curve of the optical imaging system according to Embodiment 4.
Figure 8D:
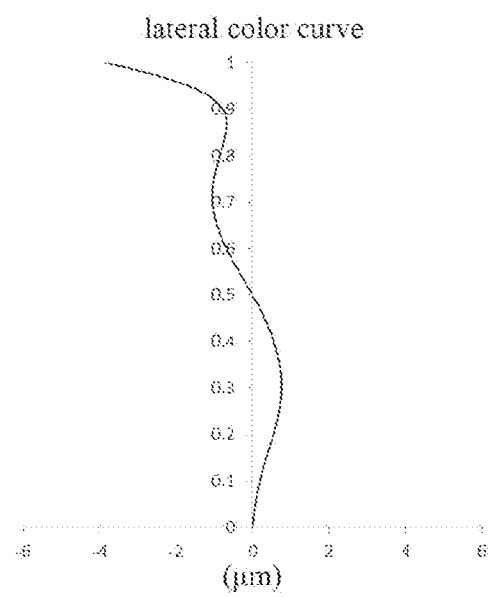
FIG. 8D illustrates a lateral color curve of the optical imaging system according to Embodiment 4.

FIG. 8A illustrates a longitudinal aberration curve of the optical imaging system according to Embodiment 4, representing deviations of focal points of light of different wavelengths converged after passing through an optical system. FIG. 8B illustrates an astigmatic curve of the optical imaging system according to Embodiment 4, representing a curvature of a tangential image plane and a curvature of a sagittal image plane. FIG. 8C illustrates a distortion curve of the optical imaging system according to Embodiment 4, representing amounts of distortion at different viewing angles. FIG. 8D illustrates a lateral color curve of the optical imaging system according to Embodiment 4, representing deviations of different image heights on an image plane after light passes through the optical imaging system. It can be seen according to FIGS. 8A-8D that the optical imaging system provided in Embodiment 4 achieves a good image quality.

Embodiment 5

Figure 9:
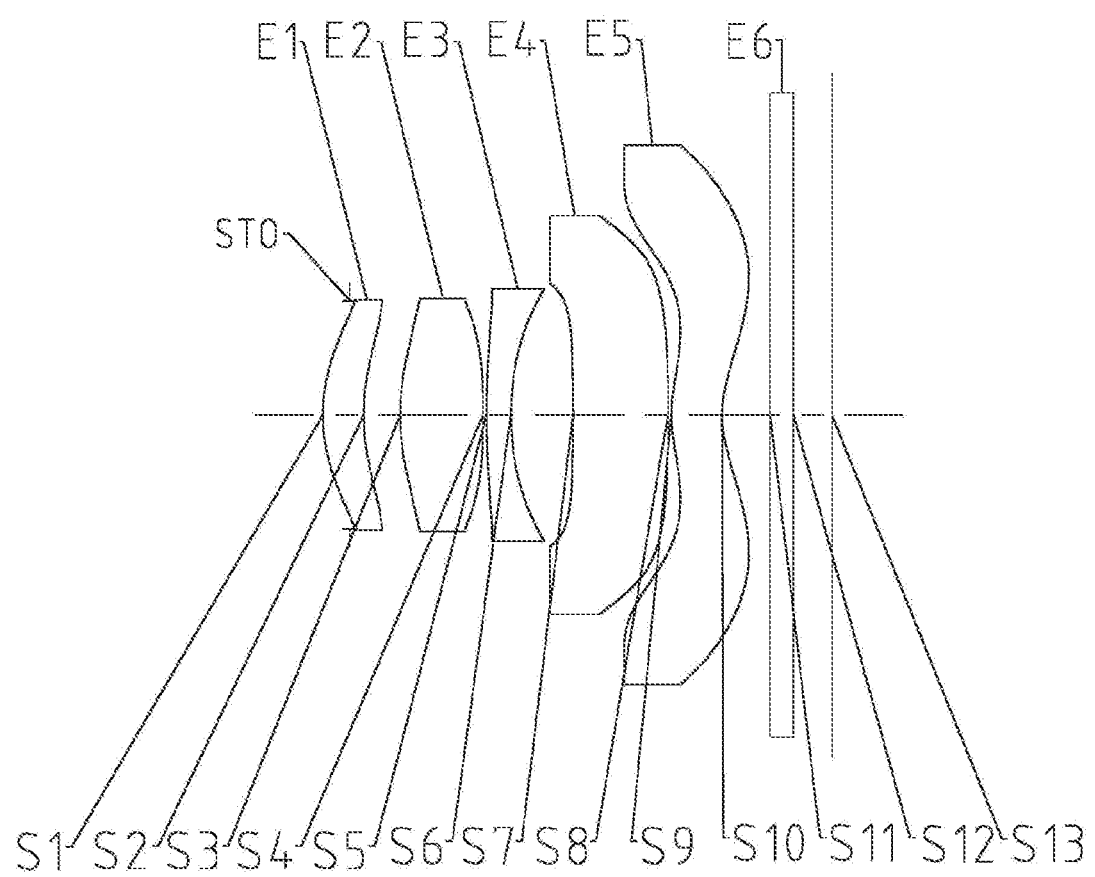
FIG. 9 is a schematic structural diagram illustrating an optical imaging system according to Embodiment 5 of the present disclosure.

An optical imaging system according to Embodiment 5 of the present disclosure is described below with reference to FIGS. 9-10D. FIG. 9 is a schematic structural diagram illustrating the optical imaging system according to Embodiment 5.

As shown in FIG. 9, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 13 shows the surface type, the radius of curvature, the thickness, the material and the conic coefficient of each lens in Embodiment 5. Table 14 shows the high-order coefficients of each mirror surface in Embodiment 5. Table 15 shows the effective focal lengths f1-f5 of the lenses, the total effective focal length f of the optical imaging system, the total track length TTL of the camera lens and the half of the field-of-view HFOV in Embodiment 5.

TABLE 13

| surface number | surface type | radius of curvature | thickness | material | conic coefficient |
|---|---|---|---|---|---|
| OBJ | spherical | infinite | infinite | | |
| STO | spherical | infinite | −0.2435 | | |
| S1 | aspheric | 1.5722 | 0.3679 | 1.54, 56.1 | −7.6074 |
| S2 | aspheric | 1.9772 | 0.3289 | | −7.5925 |
| S3 | aspheric | 2.1935 | 0.7480 | 1.54, 56.1 | −8.5126 |
| S4 | aspheric | −6.2882 | 0.0300 | | −87.6338 |
| S5 | aspheric | 6.6474 | 0.2200 | 1.66, 20.4 | 21.9012 |
| S6 | aspheric | 2.5267 | 0.5599 | | −12.7112 |
| S7 | aspheric | −14.9943 | 0.8560 | 1.64, 23.5 | 13.3405 |
| S8 | aspheric | 45.3545 | 0.0300 | | −99.0000 |
| S9 | aspheric | 1.3208 | 0.4565 | 1.54, 56.1 | −8.0832 |
| S10 | aspheric | 1.0695 | 0.4339 | | −2.1221 |
| S11 | spherical | infinite | 0.2100 | 1.52, 64.2 | |
| S12 | spherical | infinite | 0.3464 | | |
| S13 | spherical | infinite | | | |

TABLE 14

| surface number | A4 | A6 | A8 | A10 | A12 |
|---|---|---|---|---|---|
| S1 | 2.0775E−01 | −2.8576E−01 | 3.4957E−01 | −4.1160E−01 | 3.3065E−01 |
| S2 | 6.0168E−02 | −8.7148E−02 | −1.1149E−01 | 3.1421E−01 | −4.1377E−01 |
| S3 | 5.9991E−02 | −9.9593E−02 | 4.4989E−03 | 1.0155E−01 | −2.7225E−01 |
| S4 | −7.6548E−02 | −1.9494E−01 | 6.1165E−01 | −1.1020E+00 | 1.1530E+00 |
| S5 | −2.0220E−02 | −2.1972E−01 | 6.5643E−01 | −1.0428E+00 | 9.7065E−01 |
| S6 | 1.2448E−01 | −1.9219E−01 | 4.4879E−01 | −6.7188E−01 | 6.2858E−01 |
| S7 | 6.7260E−02 | −1.9190E−01 | 9.7890E−02 | 3.3451E−01 | −1.0229E+00 |

TABLE 14-continued

| | | | | | |
|---|---|---|---|---|---|
| S8 | −2.3694E−01 | 5.1077E−01 | −7.1276E−01 | 6.4595E−01 | −4.0052E−01 |
| S9 | −3.0337E−01 | 1.9230E−01 | −6.5143E−02 | −1.7946E−02 | 2.6406E−02 |
| S10 | −3.1430E−01 | 2.4087E−01 | −1.3715E−01 | 5.5171E−02 | −1.5824E−02 |

| surface number | A14 | A16 | A18 | A20 |
|---|---|---|---|---|
| S1 | −1.7355E−01 | 4.4847E−02 | 0 | 0 |
| S2 | 2.7394E−01 | −6.4539E−02 | 0 | 0 |
| S3 | 2.8831E−01 | −9.4067E−02 | 0 | 0 |
| S4 | −6.2699E−01 | 1.4108E−01 | 0 | 0 |
| S5 | −4.6918E−01 | 8.3149E−02 | 0 | 0 |
| S6 | −3.2966E−01 | 7.0767E−02 | 0 | 0 |
| S7 | 1.2817E+00 | −8.4929E−01 | 2.8423E−01 | −3.7406E−02 |
| S8 | 1.6679E−01 | −4.4319E−02 | 6.7435E−03 | −4.4383E−04 |
| S9 | −1.0369E−02 | 2.0151E−03 | −1.9862E−04 | 7.9348E−06 |
| S10 | 3.1692E−03 | −4.1369E−04 | 3.0927E−05 | −9.8630E−07 |

TABLE 15

| | | | |
|---|---|---|---|
| f1(mm) | 10.64 | f(mm) | 3.66 |
| f2(mm) | 3.07 | TTL(mm) | 4.59 |
| f3(mm) | −6.25 | HFOV(deg) | 39.0 |
| f4(mm) | −17.39 | | |
| f5(mm) | −28.69 | | |

Figure 10A:
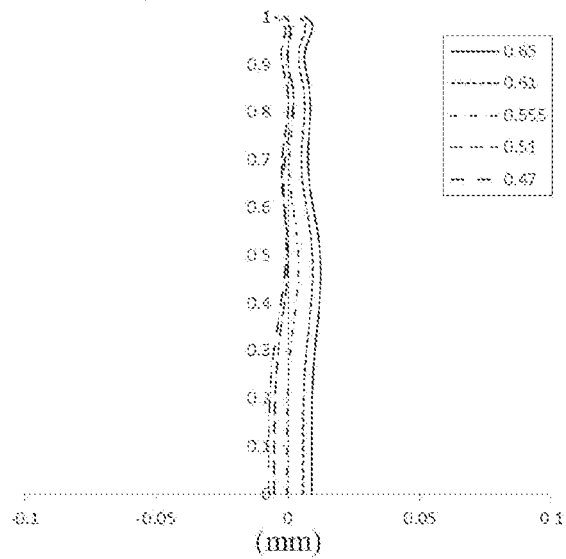
FIG. 10A illustrates a longitudinal aberration curve of the optical imaging system according to Embodiment 5.
Figure 10B:
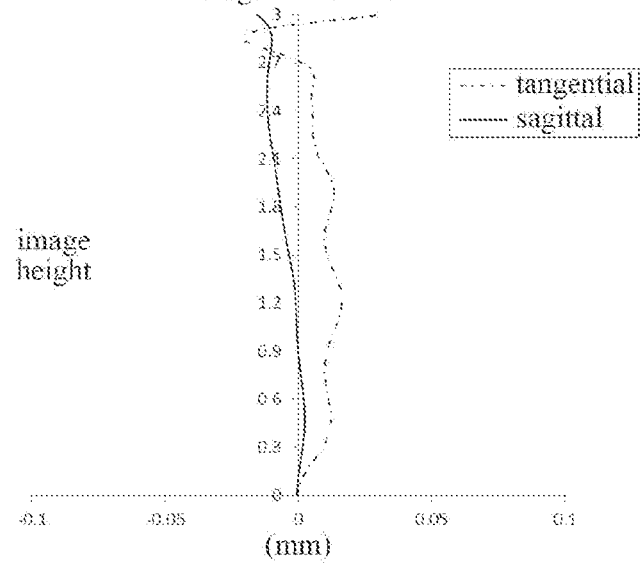
FIG. 10B illustrates an astigmatic curve of the optical imaging system according to Embodiment 5.
Figure 10C:
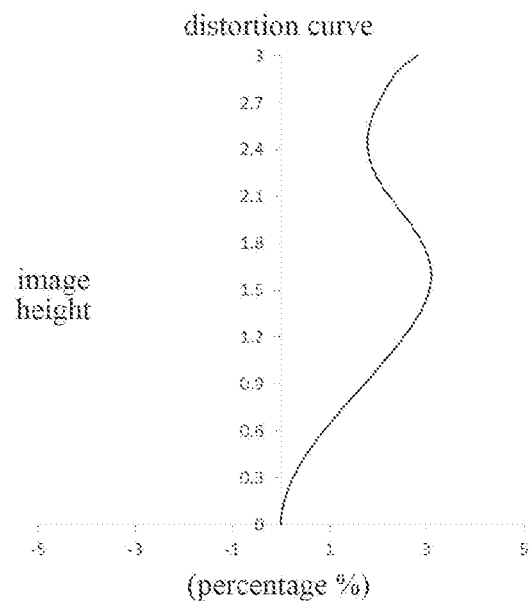
FIG. 10C illustrates a distortion curve of the optical imaging system according to Embodiment 5.
Figure 10D:
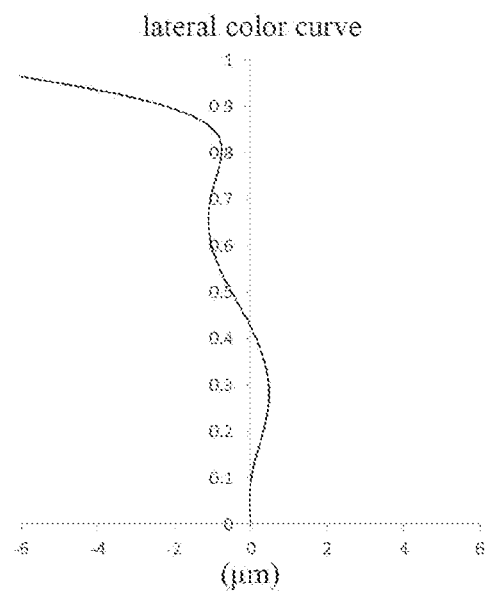
FIG. 10D illustrates a lateral color curve of the optical imaging system according to Embodiment 5.

FIG. 10A illustrates a longitudinal aberration curve of the optical imaging system according to Embodiment 5, representing deviations of focal points of light of different wavelengths converged after passing through an optical system. FIG. 10B illustrates an astigmatic curve of the optical imaging system according to Embodiment 5, representing a curvature of a tangential image plane and a curvature of a sagittal image plane. FIG. 10O illustrates a distortion curve of the optical imaging system according to Embodiment 5, representing amounts of distortion at different viewing angles. FIG. 10D illustrates a lateral color curve of the optical imaging system according to Embodiment 5, representing deviations of different image heights on an image plane after light passes through the optical imaging system. It can be seen according to FIGS. 10A-10D that the optical imaging system provided in Embodiment 5 achieves a good image quality.

Embodiment 6

Figure 11:
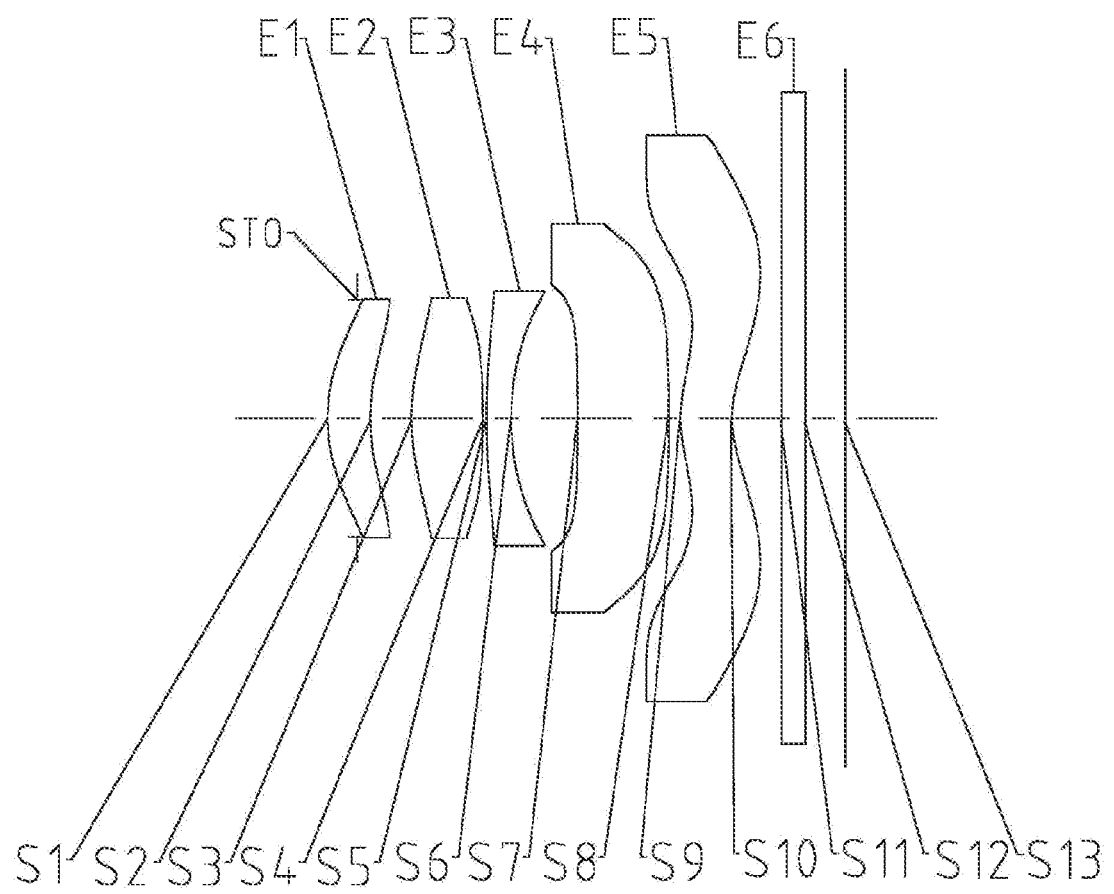
FIG. 11 is a schematic structural diagram illustrating an optical imaging system according to Embodiment 6 of the present disclosure.

An optical imaging system according to Embodiment 6 of the present disclosure is described below with reference to FIGS. 11-12D. FIG. 11 is a schematic structural diagram illustrating the optical imaging system according to Embodiment 6.

As shown in FIG. 11, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 16 shows the surface type, the radius of curvature, the thickness, the material and the conic coefficient of each lens in Embodiment 6. Table 17 shows the high-order coefficients of each mirror surface in Embodiment 6. Table 18 shows the effective focal lengths f1-f5 of the lenses, the total effective focal length f of the optical imaging system, the total track length TTL of the camera lens and the half of the field-of-view HFOV in Embodiment 6.

TABLE 16

| surface number | surface type | radius of curvature | thickness | material | conic coefficient |
|---|---|---|---|---|---|
| OBJ | spherical | infinite | infinite | | |
| STO | spherical | infinite | −0.2617 | | |
| S1 | aspheric | 1.5541 | 0.3808 | 1.54, 56.1 | −7.1105 |
| S2 | aspheric | 2.0177 | 0.3634 | | −7.2839 |
| S3 | aspheric | 2.2081 | 0.6325 | 1.54, 56.1 | −8.5651 |
| S4 | aspheric | −6.9880 | 0.0300 | | −87.6338 |
| S5 | aspheric | 5.9103 | 0.2200 | 1.66, 20.4 | 19.1848 |
| S6 | aspheric | 2.2931 | 0.5907 | | −13.3970 |
| S7 | aspheric | −17.5758 | 0.8036 | 1.64, 23.5 | 13.3405 |
| S8 | aspheric | 11.6138 | 0.1052 | | −99.0000 |
| S9 | aspheric | 1.1346 | 0.4565 | 1.54, 56.1 | −5.9577 |
| S10 | aspheric | 1.0168 | 0.4411 | | −3.1894 |
| S11 | spherical | infinite | 0.2100 | 1.52, 64.2 | |
| S12 | spherical | infinite | 0.3537 | | |
| S13 | spherical | infinite | | | |

TABLE 17

| surface number | A4 | A6 | A8 | A10 | A12 |
|---|---|---|---|---|---|
| S1 | 2.0491E−01 | −2.6182E−01 | 3.2306E−01 | −4.0586E−01 | 3.5702E−01 |
| S2 | 5.9853E−02 | −7.1530E−02 | −1.2305E−01 | 3.1261E−01 | −4.0362E−01 |
| S3 | 6.3174E−02 | −9.3394E−02 | −2.8580E−02 | 1.8689E−01 | −4.0939E−01 |
| S4 | −5.4622E−02 | −1.1793E−01 | 3.4167E−01 | −6.9098E−01 | 7.7396E−01 |
| S5 | −4.1835E−02 | −6.5638E−02 | 2.5261E−01 | −4.1949E−01 | 3.7182E−01 |
| S6 | 1.3004E−01 | −1.7634E−01 | 3.9622E−01 | −5.9994E−01 | 5.6948E−01 |

TABLE 17-continued

| | | | | | |
|---|---|---|---|---|---|
| S7 | 4.6319E−02 | −3.1050E−01 | 1.0349E+00 | −2.8552E+00 | 5.1317E+00 |
| S8 | −3.6444E−01 | 8.3121E−01 | −1.2448E+00 | 1.2067E+00 | −7.8913E−01 |
| S9 | −3.9306E−01 | 4.1560E−01 | −3.3760E−01 | 1.7376E−01 | −5.5810E−02 |
| S10 | −2.3714E−01 | 1.8533E−01 | −1.0678E−01 | 4.1159E−02 | −1.0788E−02 |

| surface number | A14 | A16 | A18 | A20 |
|---|---|---|---|---|
| S1 | −2.0390E−01 | 5.3974E−02 | 0 | 0 |
| S2 | 2.5828E−01 | −5.8679E−02 | 0 | 0 |
| S3 | 3.8637E−01 | −1.1791E−01 | 0 | 0 |
| S4 | −4.2809E−01 | 9.8000E−02 | 0 | 0 |
| S5 | −1.4301E−01 | 6.4579E−03 | 0 | 0 |
| S6 | −3.0319E−01 | 6.5829E−02 | 0 | 0 |
| S7 | −5.9036E+00 | 4.1751E+00 | −1.6558E+00 | 2.8102E−01 |
| S8 | 3.4431E−01 | −9.5853E−02 | 1.5354E−02 | −1.0723E−03 |
| S9 | 1.1572E−02 | −1.5563E−03 | 1.2675E−04 | −4.8054E−06 |
| S10 | 1.9591E−03 | −2.4034E−04 | 1.7946E−05 | −6.0942E−07 |

TABLE 18

| | | | |
|---|---|---|---|
| f1(mm) | 9.64 | f(mm) | 3.73 |
| f2(mm) | 3.16 | TTL(mm) | 4.59 |
| f3(mm) | −5.81 | HFOV(deg) | 38.5 |
| f4(mm) | −10.82 | | |
| f5(mm) | 49.29 | | |

Figure 12A:
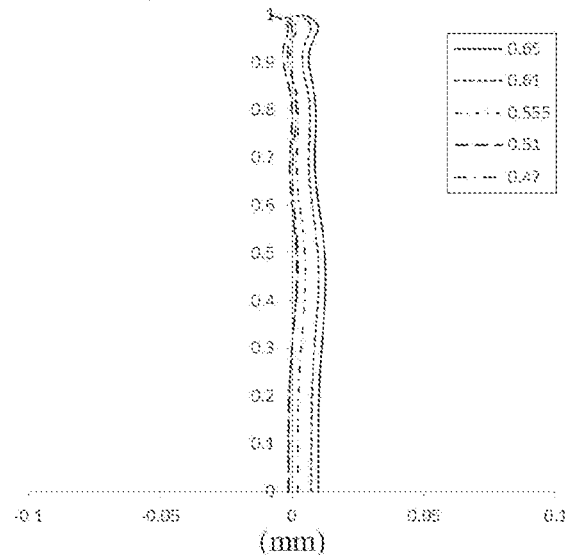
FIG. 12A illustrates a longitudinal aberration curve of the optical imaging system according to Embodiment 6.
Figure 12B:
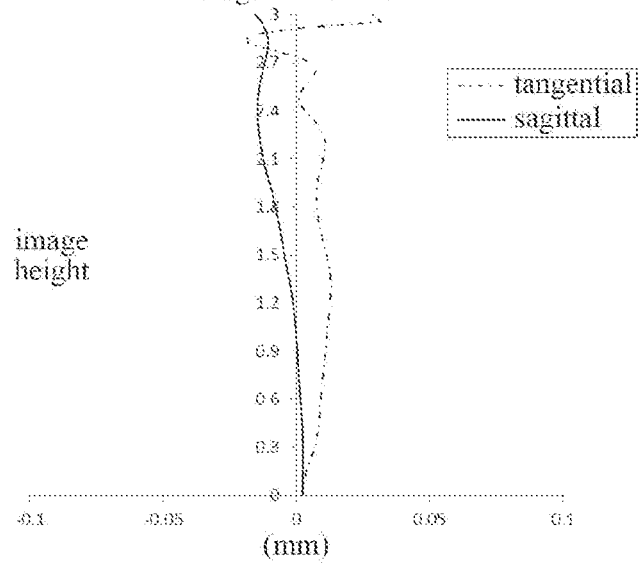
FIG. 12B illustrates an astigmatic curve of the optical imaging system according to Embodiment 6.
Figure 12C:
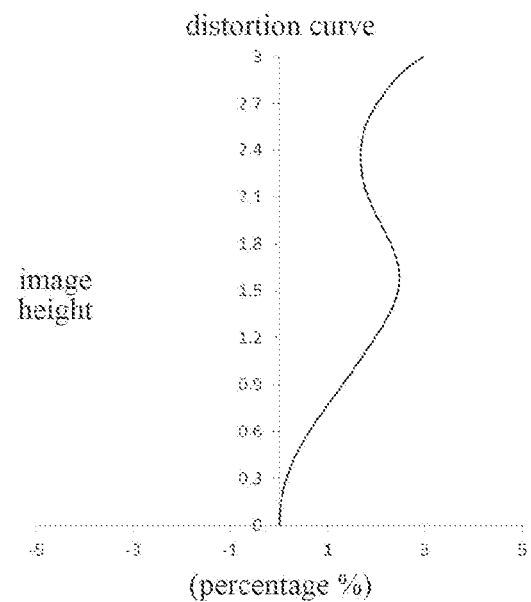
FIG. 12C illustrates a distortion curve of the optical imaging system according to Embodiment 6.
Figure 12D:
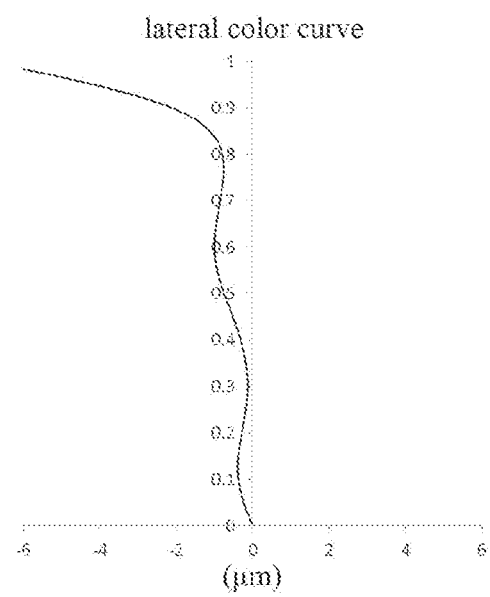
FIG. 12D illustrates a lateral color curve of the optical imaging system according to Embodiment 6.

FIG. 12A illustrates a longitudinal aberration curve of the optical imaging system according to Embodiment 6, representing deviations of focal points of light of different wavelengths converged after passing through an optical system. FIG. 12B illustrates an astigmatic curve of the optical imaging system according to Embodiment 6, representing a curvature of a tangential image plane and a curvature of a sagittal image plane. FIG. 12C illustrates a distortion curve of the optical imaging system according to Embodiment 6, representing amounts of distortion at different viewing angles. FIG. 12D illustrates a lateral color curve of the optical imaging system according to Embodiment 6, representing deviations of different image heights on an image plane after light passes through the optical imaging system. It can be seen according to FIGS. 12A-12D that the optical imaging system provided in Embodiment 6 achieves a good image quality.

Embodiment 7

Figure 13:
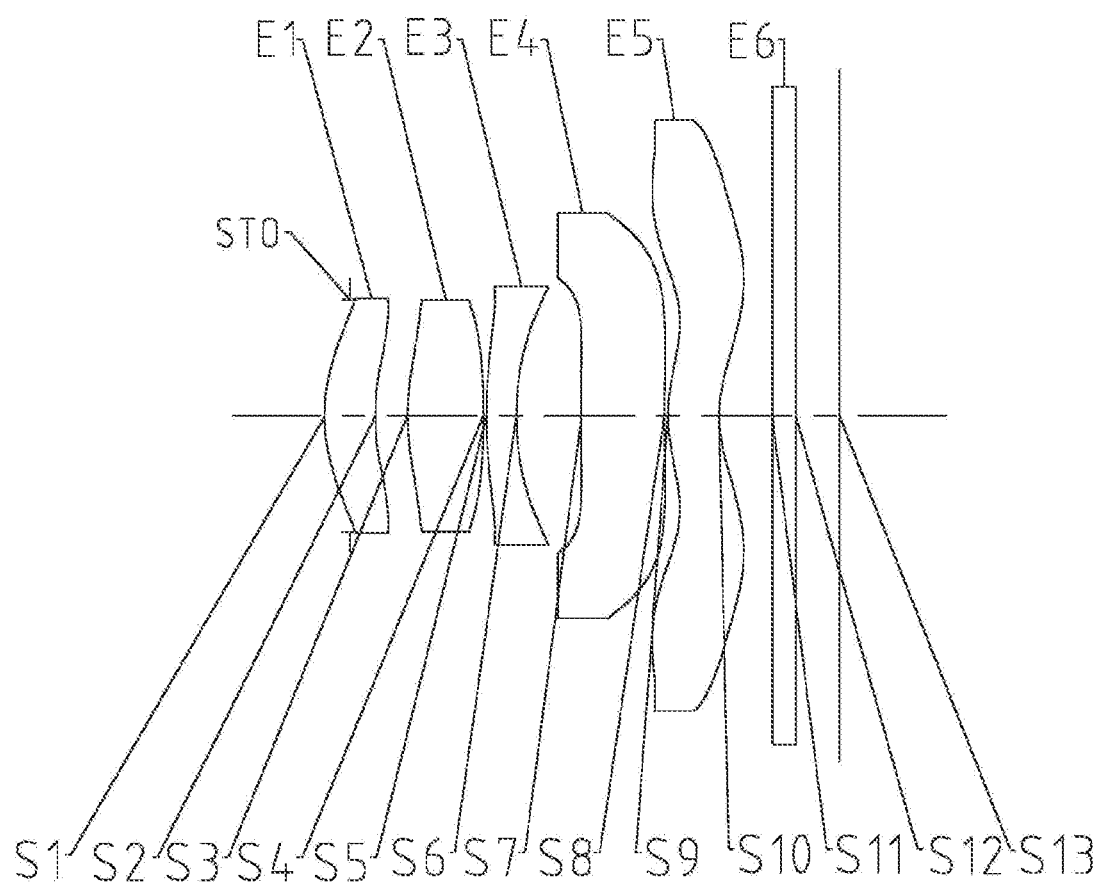
FIG. 13 is a schematic structural diagram illustrating an optical imaging system according to Embodiment 7 of the present disclosure.

An optical imaging system according to Embodiment 7 of the present disclosure is described below with reference to FIGS. 13-14D. FIG. 13 is a schematic structural diagram illustrating the optical imaging system according to Embodiment 7.

As shown in FIG. 13, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 19 shows the surface type, the radius of curvature, the thickness, the material and the conic coefficient of each lens in Embodiment 7. Table 20 shows the high-order coefficients of each mirror surface in Embodiment 7. Table 21 shows the effective focal lengths f1-f5 of the lenses, the total effective focal length f of the optical imaging system, the total track length TTL of the camera lens and the half of the field-of-view HFOV in Embodiment 7.

TABLE 19

| surface number | surface type | radius of curvature | thickness | material | conic coefficient |
|---|---|---|---|---|---|
| OBJ | spherical | infinite | infinite | | |
| STO | spherical | infinite | −0.2222 | | |
| S1 | aspheric | 1.6348 | 0.4529 | 1.54, 56.1 | −8.6908 |
| S2 | aspheric | 2.1318 | 0.2884 | | −11.9613 |
| S3 | aspheric | 2.4424 | 0.6727 | 1.54, 56.1 | −13.4279 |
| S4 | aspheric | −9.0840 | 0.0300 | | −87.6338 |
| S5 | aspheric | 4.8178 | 0.2643 | 1.66, 20.4 | 16.0520 |
| S6 | aspheric | 2.4204 | 0.5808 | | −12.8529 |
| S7 | aspheric | −334.3239 | 0.7393 | 1.64, 23.5 | 13.3405 |
| S8 | aspheric | 9.5878 | 0.0300 | | −99.0000 |
| S9 | aspheric | 1.3081 | 0.4565 | 1.54, 56.1 | −7.0390 |
| S10 | aspheric | 1.1906 | 0.4743 | | −2.0554 |
| S11 | spherical | infinite | 0.2100 | 1.52, 64.2 | |
| S12 | spherical | infinite | 0.3884 | | |
| S13 | spherical | infinite | | | |

TABLE 20

| surface number | A4 | A6 | A8 | A10 | A12 |
|---|---|---|---|---|---|
| S1 | 2.0417E−01 | −2.8615E−01 | 3.0181E−01 | −2.8030E−01 | 1.6974E−01 |
| S2 | 7.4393E−02 | −2.0980E−01 | 1.3787E−01 | −9.0528E−02 | 4.0510E−03 |
| S3 | 5.6547E−02 | −1.5774E−01 | 1.2312E−01 | −1.7358E−01 | 9.2043E−02 |
| S4 | −9.5745E−02 | 1.3950E−01 | −3.6205E−01 | 3.5479E−01 | −9.1510E−02 |
| S5 | −1.0274E−01 | 2.7135E−01 | −6.7818E−01 | 1.0409E+00 | −1.0338E+00 |

TABLE 20-continued

| | | | | |
|---|---|---|---|---|
| S6 | 9.1242E−02 | −5.4053E−02 | 1.5367E−01 | −3.1256E−01 | 3.4714E−01 |
| S7 | 7.6380E−02 | −2.8122E−01 | 5.5266E−01 | −1.1190E+00 | 1.7618E+00 |
| S8 | −1.2244E−01 | 2.3567E−01 | −3.6808E−01 | 3.5119E−01 | −2.1580E−01 |
| S9 | −1.8655E−01 | 4.3349E−02 | −2.9365E−02 | 3.6650E−02 | −1.9139E−02 |
| S10 | −2.4216E−01 | 1.2785E−01 | −5.1875E−02 | 1.4504E−02 | −2.5763E−03 |

| surface number | A14 | A16 | A18 | A20 |
|---|---|---|---|---|
| S1 | −7.7751E−02 | 2.2056E−02 | 0 | 0 |
| S2 | 5.4618E−02 | −2.1166E−02 | 0 | 0 |
| S3 | 9.6567E−02 | −6.5875E−02 | 0 | 0 |
| S4 | −3.1785E−02 | 1.2314E−02 | 0 | 0 |
| S5 | 6.1491E−01 | −1.7400E−01 | 0 | 0 |
| S6 | −2.0341E−01 | 4.7063E−02 | 0 | 0 |
| S7 | −1.9347E+00 | 1.3454E+00 | −5.3030E−01 | 8.9529E−02 |
| S8 | 8.4823E−02 | −2.0510E−02 | 2.7589E−03 | −1.5638E−04 |
| S9 | 5.1589E−03 | −7.7530E−04 | 6.2200E−05 | −2.0896E−06 |
| S10 | 3.1009E−04 | −3.0922E−05 | 2.5568E−06 | −1.0741E−07 |

TABLE 21

| f1(mm) | 9.76 | f(mm) | 3.70 |
|---|---|---|---|
| f2(mm) | 3.61 | TTL(mm) | 4.59 |
| f3(mm) | −7.70 | HFOV(deg) | 38.9 |
| f4(mm) | −14.56 | | |
| f5(mm) | 65.96 | | |

Figure 14A:
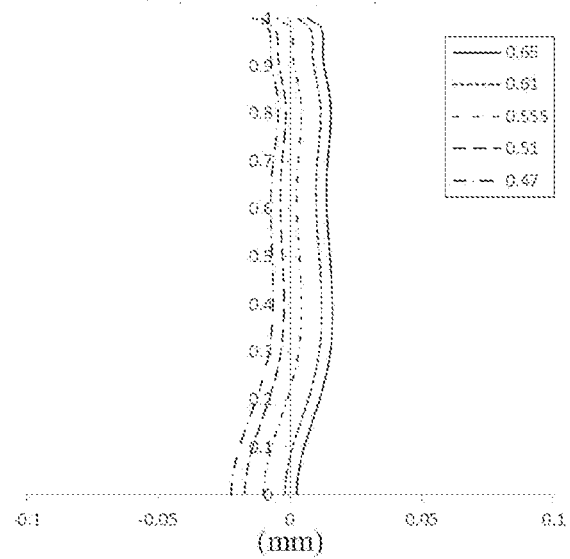
FIG. 14A illustrates a longitudinal aberration curve of the optical imaging system according to Embodiment 7.
Figure 14B:
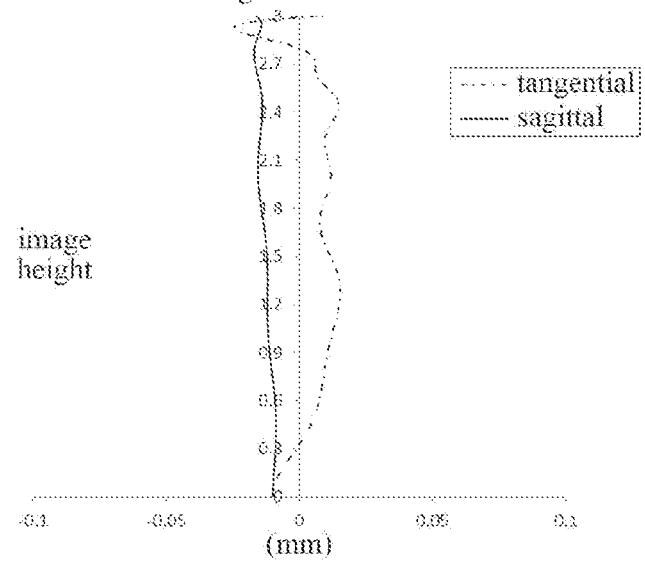
FIG. 14B illustrates an astigmatic curve of the optical imaging system according to Embodiment 7.
Figure 14C:
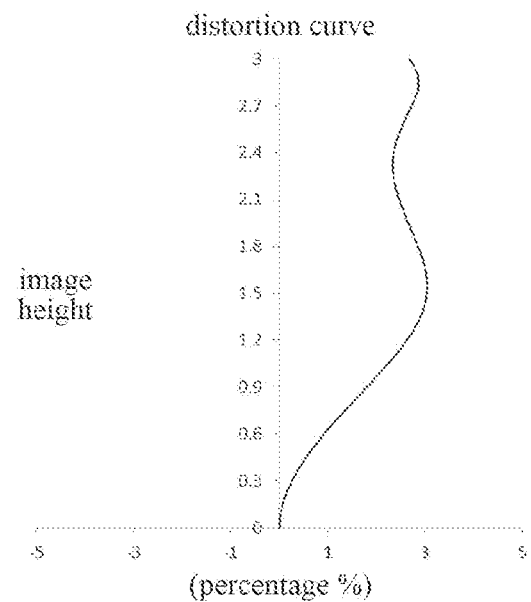
FIG. 14C illustrates a distortion curve of the optical imaging system according to Embodiment 7.
Figure 14D:
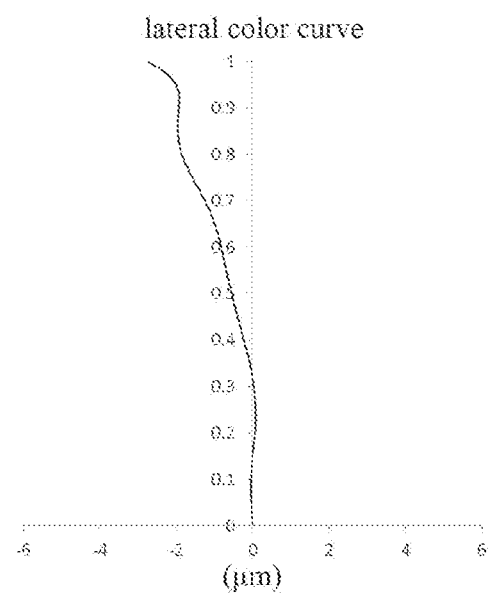
FIG. 14D illustrates a lateral color curve of the optical imaging system according to Embodiment 7.

FIG. 14A illustrates a longitudinal aberration curve of the optical imaging system according to Embodiment 7, representing deviations of focal points of light of different wavelengths converged after passing through an optical system. FIG. 14B illustrates an astigmatic curve of the optical imaging system according to Embodiment 7, representing a curvature of a tangential image plane and a curvature of a sagittal image plane. FIG. 14C illustrates a distortion curve of the optical imaging system according to Embodiment 7, representing amounts of distortion at different viewing angles. FIG. 14D illustrates a lateral color curve of the optical imaging system according to Embodiment 7, representing deviations of different image heights on an image plane after light passes through the optical imaging system. It can be seen according to FIGS. 14A-14D that the optical imaging system provided in Embodiment 7 achieves a good image quality.

Embodiment 8

Figure 15:
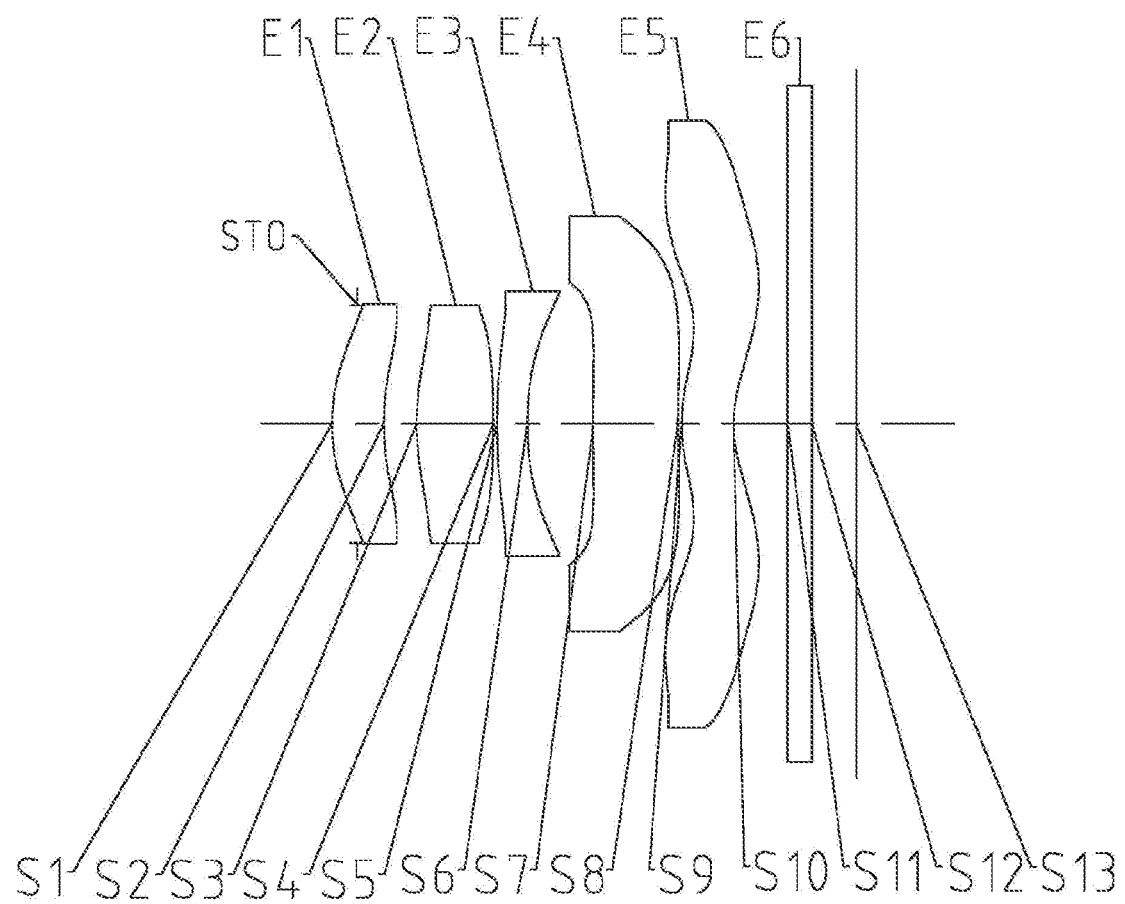
FIG. 15 is a schematic structural diagram illustrating an optical imaging system according to Embodiment 8 of the present disclosure.

An optical imaging system according to Embodiment 8 of the present disclosure is described below with reference to FIGS. 15-16D. FIG. 15 is a schematic structural diagram illustrating the optical imaging system according to Embodiment 8.

As shown in FIG. 15, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 22 shows the surface type, the radius of curvature, the thickness, the material and the conic coefficient of each lens in Embodiment 8. Table 23 shows the high-order coefficients of each mirror surface in Embodiment 8. Table 24 shows the effective focal lengths f1-f5 of the lenses, the total effective focal length f of the optical imaging system, the total track length TTL of the camera lens and the half of the field-of-view HFOV in Embodiment 8.

TABLE 22

| surface number | surface type | radius of curvature | thickness | material | conic coefficient |
|---|---|---|---|---|---|
| OBJ | spherical | infinite | infinite | | |
| STO | spherical | infinite | −0.2218 | | |
| S1 | aspheric | 1.6349 | 0.4525 | 1.54, 56.1 | −8.6923 |
| S2 | aspheric | 2.1317 | 0.2883 | | −11.9591 |
| S3 | aspheric | 2.4419 | 0.6721 | 1.54, 56.1 | −13.4329 |
| S4 | aspheric | −9.0850 | 0.0300 | | −87.6338 |
| S5 | aspheric | 4.8175 | 0.2640 | 1.66, 20.4 | 16.0535 |
| S6 | aspheric | 2.4168 | 0.5799 | | −12.8602 |
| S7 | aspheric | 1434.2319 | 0.7386 | 1.64, 23.5 | 13.3405 |
| S8 | aspheric | 9.3705 | 0.0301 | | −99.0000 |
| S9 | aspheric | 1.3081 | 0.4565 | 1.54, 56.1 | −7.0530 |
| S10 | aspheric | 1.1906 | 0.4741 | | −2.0563 |
| S11 | spherical | infinite | 0.2100 | 1.52, 64.2 | |
| S12 | spherical | infinite | 0.3883 | | |
| S13 | spherical | infinite | | | |

TABLE 23

| surface number | A4 | A6 | A8 | A10 | A12 |
|---|---|---|---|---|---|
| S1 | 2.0436E−01 | −2.8806E−01 | 3.0977E−01 | −2.9737E−01 | 1.8929E−01 |
| S2 | 7.4570E−02 | −2.1148E−01 | 1.4412E−01 | −1.0285E−01 | 1.7433E−02 |
| S3 | 5.6727E−02 | −1.5841E−01 | 1.2398E−01 | −1.7431E−01 | 9.2481E−02 |
| S4 | −9.5832E−02 | 1.3972E−01 | −3.5967E−01 | 3.4525E−01 | −7.7568E−02 |

TABLE 23-continued

| | | | | | |
|---|---|---|---|---|---|
| S5 | −1.0270E−01 | 2.7028E−01 | −6.7378E−01 | 1.0329E+00 | −1.0264E+00 |
| S6 | 9.1751E−02 | −5.7286E−02 | 1.6147E−01 | −3.2239E−01 | 3.5384E−01 |
| S7 | 7.4998E−02 | −2.7739E−01 | 5.4776E−01 | −1.1214E+00 | 1.7800E+00 |
| S8 | −1.2218E−01 | 2.3583E−01 | −3.6863E−01 | 3.5187E−01 | −2.1629E−01 |
| S9 | −1.8679E−01 | 4.2939E−02 | −2.8787E−02 | 3.6355E−02 | −1.9055E−02 |
| S10 | −2.4265E−01 | 1.2847E−01 | −5.2332E−02 | 1.4728E−02 | −2.6496E−03 |

| surface number | A14 | A16 | A18 | A20 |
|---|---|---|---|---|
| S1 | −8.9088E−02 | 2.4670E−02 | 0 | 0 |
| S2 | 4.7227E−02 | −1.9560E−02 | 0 | 0 |
| S3 | 9.6510E−02 | −6.5922E−02 | 0 | 0 |
| S4 | −4.1011E−02 | 1.4640E−02 | 0 | 0 |
| S5 | 6.1148E−01 | −1.7338E−01 | 0 | 0 |
| S6 | −2.0570E−01 | 4.7359E−02 | 0 | 0 |
| S7 | −1.9615E+00 | 1.3647E+00 | −5.3720E−01 | 9.0500E−02 |
| S8 | 8.5039E−02 | −2.0566E−02 | 2.7669E−03 | −1.5686E−04 |
| S9 | 5.1440E−03 | −7.7364E−04 | 6.2092E−05 | −2.0864E−06 |
| S10 | 3.2582E−04 | −3.3050E−05 | 2.7214E−06 | −1.1293E−07 |

TABLE 24

| | | | |
|---|---|---|---|
| f1(mm) | 9.76 | f(mm) | 3.69 |
| f2(mm) | 3.61 | TTL(mm) | 4.58 |
| f3(mm) | −7.68 | HFOV(deg) | 38.9 |
| f4(mm) | −14.75 | | |
| f5(mm) | 65.96 | | |

Figure 16A:
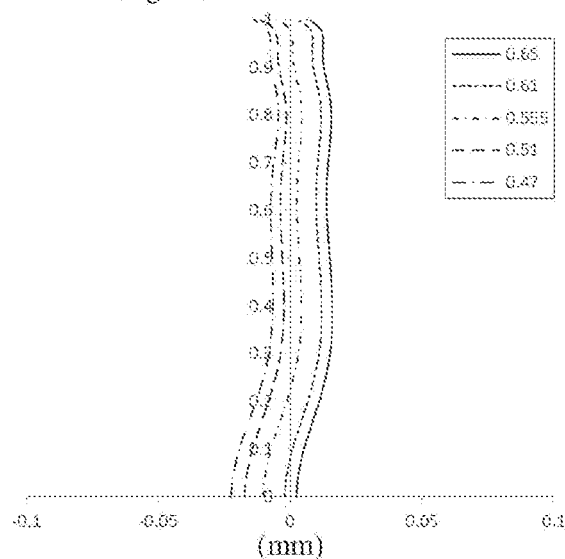
FIG. 16A illustrates a longitudinal aberration curve of the optical imaging system according to Embodiment 8.
Figure 16B:
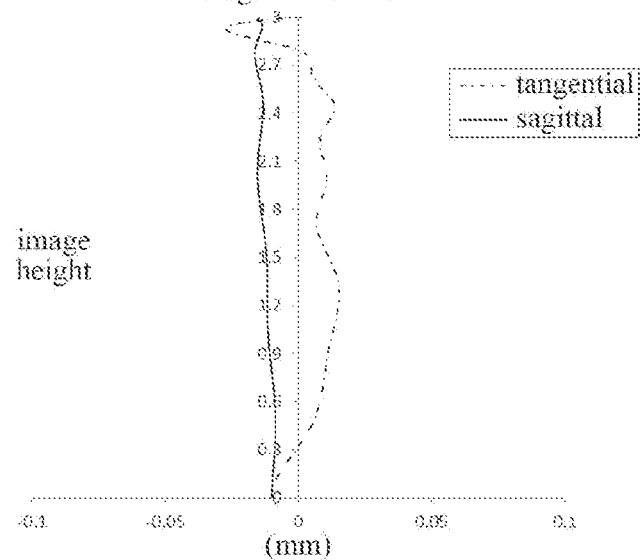
FIG. 16B illustrates an astigmatic curve of the optical imaging system according to Embodiment 8.
Figure 16C:
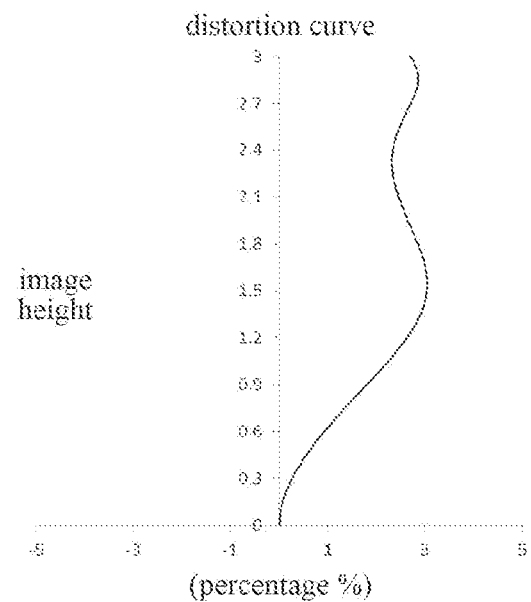
FIG. 16C illustrates a distortion curve of the optical imaging system according to Embodiment 8.
Figure 16D:
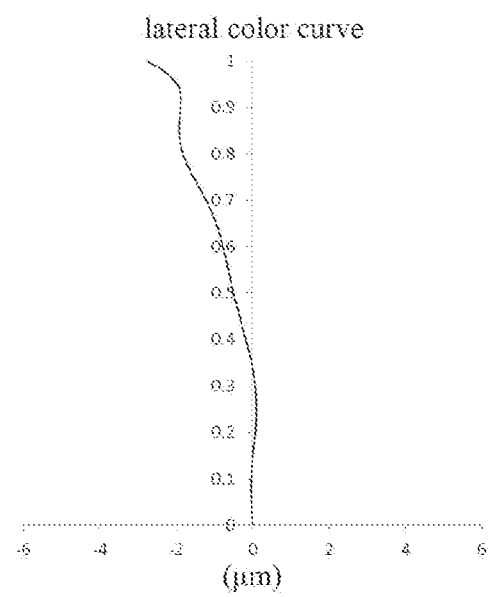
FIG. 16D illustrates a lateral color curve of the optical imaging system according to Embodiment 8.

FIG. 16A illustrates a longitudinal aberration curve of the optical imaging system according to Embodiment 8, representing deviations of focal points of light of different wavelengths converged after passing through an optical system. FIG. 16B illustrates an astigmatic curve of the optical imaging system according to Embodiment 8, representing a curvature of a tangential image plane and a curvature of a sagittal image plane. FIG. 16C illustrates a distortion curve of the optical imaging system according to Embodiment 8, representing amounts of distortion at different viewing angles. FIG. 16D illustrates a lateral color curve of the optical imaging system according to Embodiment 8, representing deviations of different image heights on an image plane after light passes through the optical imaging system. It can be seen according to FIGS. 16A-16D that the optical imaging system provided in Embodiment 8 achieves a good image quality.

Embodiment 9

Figure 17:
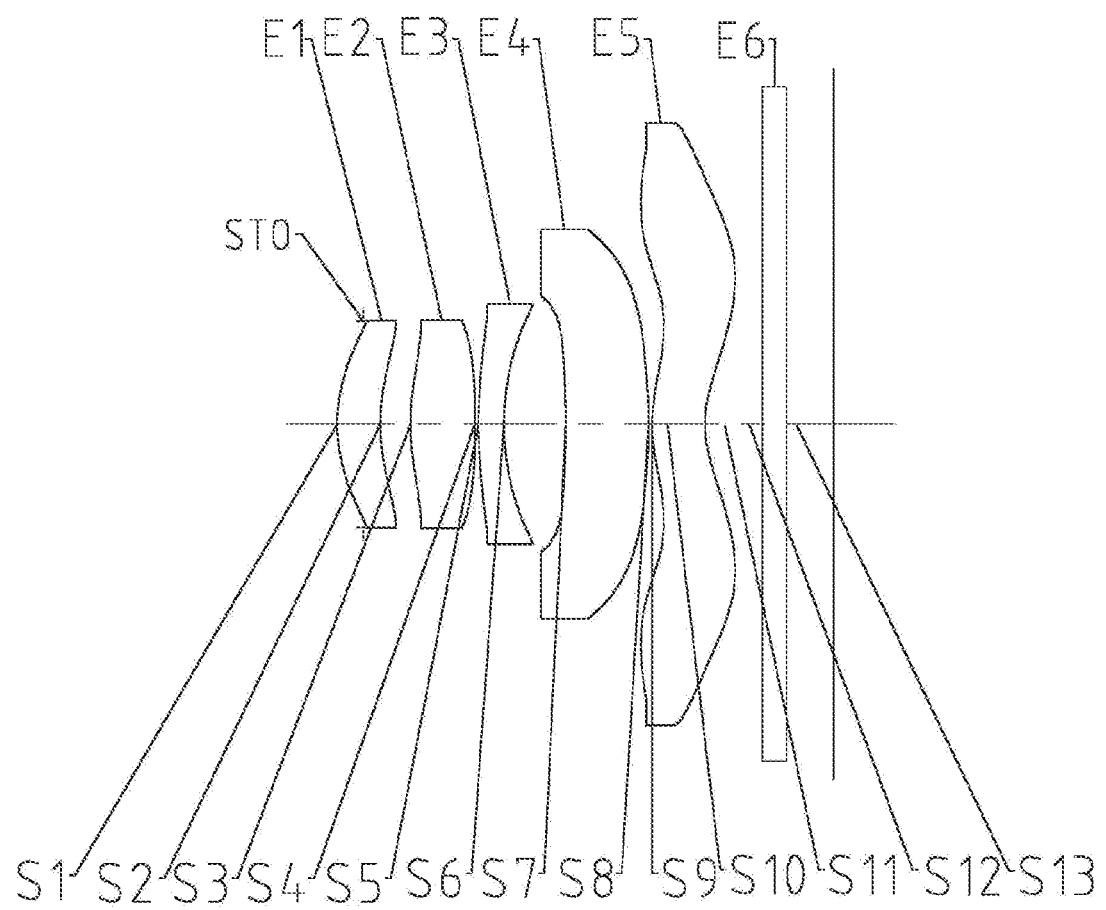
FIG. 17 is a schematic structural diagram illustrating an optical imaging system according to Embodiment 9 of the present disclosure.

An optical imaging system according to Embodiment 9 of the present disclosure is described below with reference to FIGS. 17-18D. FIG. 17 is a schematic structural diagram illustrating the optical imaging system according to Embodiment 9.

As shown in FIG. 17, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 25 shows the surface type, the radius of curvature, the thickness, the material and the conic coefficient of each lens in Embodiment 9. Table 26 shows the high-order coefficients of each mirror surface in Embodiment 9. Table 27 shows the effective focal lengths f1-f5 of the lenses, the total effective focal length f of the optical imaging system, the total track length TTL of the camera lens and the half of the field-of-view HFOV in Embodiment 9.

TABLE 25

| surface number | surface type | radius of curvature | thickness | material | conic coefficient |
|---|---|---|---|---|---|
| OBJ | spherical | infinite | infinite | | |
| STO | spherical | infinite | −0.2233 | | |
| S1 | aspheric | 1.4394 | 0.3713 | 1.54, 56.1 | −7.1410 |
| S2 | aspheric | 1.8621 | 0.2607 | | −8.3499 |
| S3 | aspheric | 2.3402 | 0.5548 | 1.54, 56.1 | −16.2309 |
| S4 | aspheric | −11.5934 | 0.0301 | | −87.6338 |
| S5 | aspheric | 4.0494 | 0.2201 | 1.66, 20.4 | 10.6492 |
| S6 | aspheric | 2.3104 | 0.5332 | | −11.4374 |
| S7 | aspheric | −6.7193 | 0.7136 | 1.64, 23.5 | 13.3405 |
| S8 | aspheric | −5.9244 | 0.0300 | | −99.0000 |
| S9 | aspheric | 1.3168 | 0.4565 | 1.54, 56.1 | −4.8871 |
| S10 | aspheric | 1.0005 | 0.4928 | | −2.1625 |
| S11 | spherical | infinite | 0.2100 | 1.52, 64.2 | |
| S12 | spherical | infinite | 0.4069 | | |
| S13 | spherical | infinite | | | |

TABLE 26

| surface number | A4 | A6 | A8 | A10 | A12 |
|---|---|---|---|---|---|
| S1 | 2.5612E−01 | −3.5916E−01 | 4.3850E−01 | −5.3613E−01 | 4.9658E−01 |
| S2 | 8.4419E−02 | −1.3685E−01 | −2.9156E−01 | 1.0233E+00 | −1.7578E+00 |
| S3 | 8.6596E−02 | −2.2438E−01 | −4.2235E−02 | 6.1738E−01 | −1.6399E+00 |

TABLE 26-continued

| | | | | | |
|---|---|---|---|---|---|
| S4 | −1.4457E−01 | −7.8704E−03 | 2.9381E−01 | −9.0874E−01 | 1.1710E+00 |
| S5 | −1.0725E−01 | 1.5467E−02 | 1.3955E−01 | −6.1606E−02 | −4.0483E−01 |
| S6 | 1.4605E−01 | −2.6731E−01 | 6.5864E−01 | −1.0551E+00 | 1.0787E+00 |
| S7 | 1.3210E−01 | −2.5294E−01 | −1.0675E−01 | 1.3802E+00 | −3.5151E+00 |
| S8 | −1.5475E−01 | 3.9676E−01 | −6.0362E−01 | 5.3038E−01 | −2.9308E−01 |
| S9 | −3.5559E−01 | 3.5938E−01 | −3.1576E−01 | 1.8717E−01 | −6.8207E−02 |
| S10 | −3.3079E−01 | 2.8664E−01 | −1.9011E−01 | 8.8490E−02 | −2.8338E−02 |

| surface number | A14 | A16 | A18 | A20 |
|---|---|---|---|---|
| S1 | −3.6935E−01 | 1.3966E−01 | 0 | 0 |
| S2 | 1.4816E+00 | −4.4974E−01 | 0 | 0 |
| S3 | 1.9093E+00 | −7.4564E−01 | 0 | 0 |
| S4 | −6.2341E−01 | 1.0094E−01 | 0 | 0 |
| S5 | 6.4526E−01 | −3.2315E−01 | 0 | 0 |
| S6 | −6.4786E−01 | 1.6378E−01 | 0 | 0 |
| S7 | 4.6635E+00 | −3.4796E+00 | 1.3533E+00 | −2.1069E−01 |
| S8 | 1.0186E−01 | −2.1270E−02 | 2.3894E−03 | −1.0822E−04 |
| S9 | 1.5271E−02 | −2.0618E−03 | 1.5466E−04 | −4.9648E−06 |
| S10 | 6.0550E−03 | −8.1338E−04 | 6.1526E−05 | −1.9877E−06 |

TABLE 27

| | | | |
|---|---|---|---|
| f1(mm) | 8.90 | f(mm) | 3.46 |
| f2(mm) | 3.63 | TTL(mm) | 4.28 |
| f3(mm) | −8.57 | HFOV(deg) | 40.8 |
| f4(mm) | 57.98 | | |
| f5(mm) | −15.58 | | |

Figure 18A:
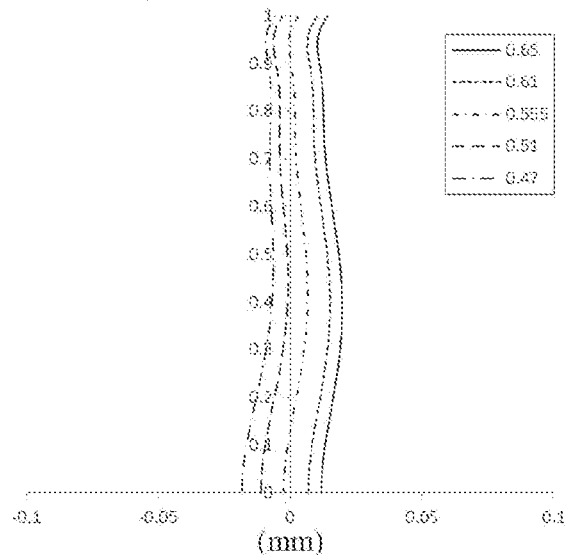
FIG. 18A illustrates a longitudinal aberration curve of the optical imaging system according to Embodiment 9.
Figure 18B:
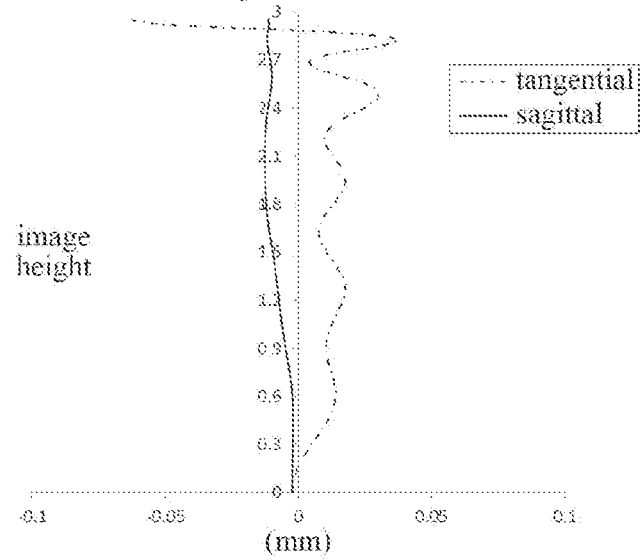
FIG. 18B illustrates an astigmatic curve of the optical imaging system according to Embodiment 9.
Figure 18C:
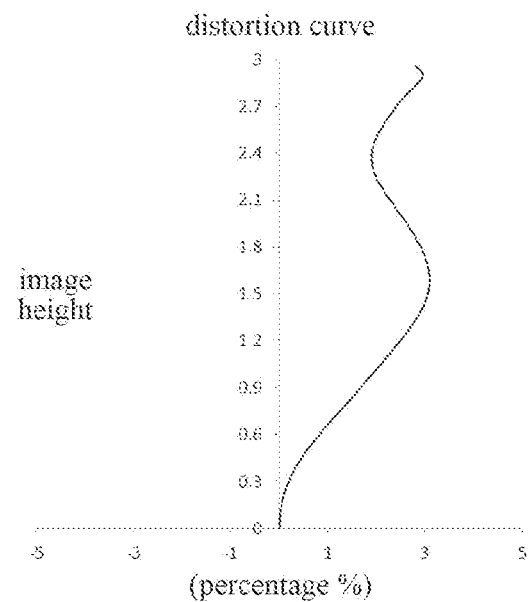
FIG. 18C illustrates a distortion curve of the optical imaging system according to Embodiment 9.
Figure 18D:
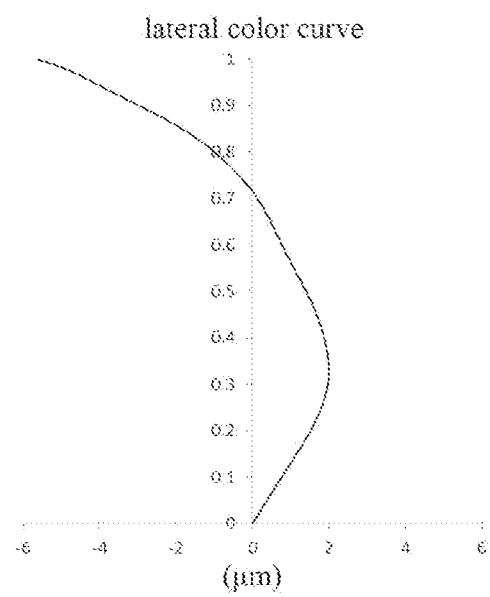
FIG. 18D illustrates a lateral color curve of the optical imaging system according to Embodiment 9.

FIG. 18A illustrates a longitudinal aberration curve of the optical imaging system according to Embodiment 9, representing deviations of focal points of light of different wavelengths converged after passing through an optical system. FIG. 18B illustrates an astigmatic curve of the optical imaging system according to Embodiment 9, representing a curvature of a tangential image plane and a curvature of a sagittal image plane. FIG. 18C illustrates a distortion curve of the optical imaging system according to Embodiment 9, representing amounts of distortion at different viewing angles. FIG. 18D illustrates a lateral color curve of the optical imaging system according to Embodiment 9, representing deviations of different image heights on an image plane after light passes through the optical imaging system. It can be seen according to FIGS. 18A-18D that the optical imaging system provided in Embodiment 9 achieves a good image quality.

Embodiment 10

Figure 19:
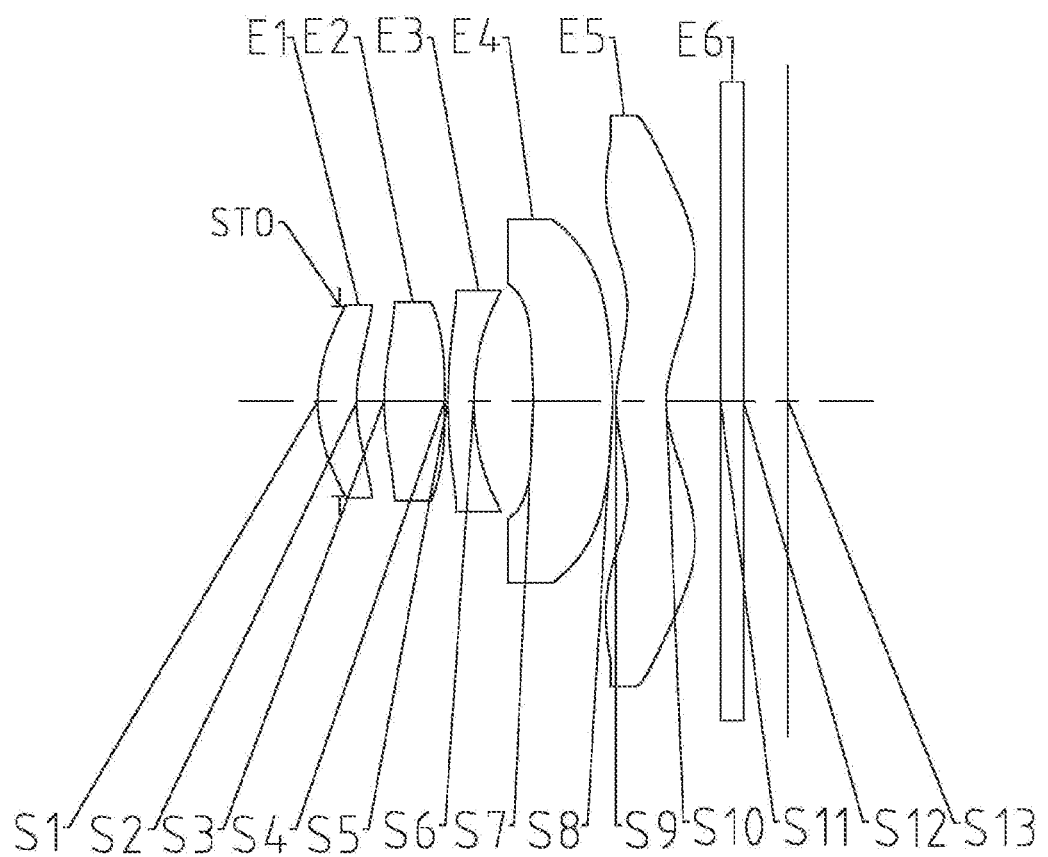
FIG. 19 is a schematic structural diagram illustrating an optical imaging system according to Embodiment 10 of the present disclosure.

An optical imaging system according to Embodiment 10 of the present disclosure is described below with reference to FIGS. 19-20D. FIG. 19 is a schematic structural diagram illustrating the optical imaging system according to Embodiment 10.

As shown in FIG. 19, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 28 shows the surface type, the radius of curvature, the thickness, the material and the conic coefficient of each lens in Embodiment 10. Table 29 shows the high-order coefficients of each mirror surface in Embodiment 10. Table 30 shows the effective focal lengths f1-f5 of the lenses, the total effective focal length f of the optical imaging system, the total track length TTL of the camera lens and the half of the field-of-view HFOV in Embodiment 10.

TABLE 28

| surface number | surface type | radius of curvature | thickness | material | conic coefficient |
|---|---|---|---|---|---|
| OBJ | spherical | infinite | infinite | | |
| STO | spherical | infinite | −0.2000 | | |
| S1 | aspheric | 1.4178 | 0.3560 | 1.54, 56.1 | −7.1760 |
| S2 | aspheric | 1.8031 | 0.2462 | | −8.4355 |
| S3 | aspheric | 2.2897 | 0.5530 | 1.54, 56.1 | −16.5379 |
| S4 | aspheric | −11.6042 | 0.0300 | | −87.6338 |
| S5 | aspheric | 4.0327 | 0.2343 | 1.66, 20.4 | 10.5087 |
| S6 | aspheric | 2.3205 | 0.5410 | | −10.6291 |
| S7 | aspheric | −5.8707 | 0.7216 | 1.64, 23.5 | 13.3405 |
| S8 | aspheric | −5.4995 | 0.0310 | | −99.0000 |
| S9 | aspheric | 1.3580 | 0.4565 | 1.54, 56.1 | −4.8914 |
| S10 | aspheric | 1.0162 | 0.4931 | | −2.1508 |
| S11 | spherical | infinite | 0.2100 | 1.52, 64.2 | |
| S12 | spherical | infinite | 0.4072 | | |
| S13 | spherical | infinite | | | |

TABLE 29

| surface number | A4 | A6 | A8 | A10 | A12 |
|---|---|---|---|---|---|
| S1 | 2.6946E−01 | −4.1326E−01 | 6.0840E−01 | −9.5835E−01 | 1.1465E+00 |
| S2 | 9.8398E−02 | −2.1966E−01 | −2.7822E−02 | 4.1105E−01 | −9.6568E−01 |

TABLE 29-continued

| | | | | | |
|---|---|---|---|---|---|
| S3 | 9.3125E−02 | −2.6333E−01 | −2.7208E−02 | 7.6995E−01 | −2.2043E+00 |
| S4 | −1.6986E−01 | 2.0811E−02 | 2.9860E−01 | −1.1343E+00 | 1.7134E+00 |
| S5 | −1.1470E−01 | 5.1097E−02 | 8.7926E−02 | −8.1169E−02 | −2.9758E−01 |
| S6 | 1.4664E−01 | −2.4917E−01 | 6.5223E−01 | −1.1319E+00 | 1.2473E+00 |
| S7 | 1.3890E−01 | −4.6188E−01 | 1.1752E+00 | −3.1455E+00 | 6.1908E+00 |
| S8 | −1.3200E−01 | 3.1629E−01 | −4.8370E−01 | 4.1603E−01 | −2.2077E−01 |
| S9 | −3.2273E−01 | 3.0593E−01 | −2.6262E−01 | 1.5424E−01 | −5.5618E−02 |
| S10 | −3.2313E−01 | 2.7873E−01 | −1.8557E−01 | 8.6703E−02 | −2.7768E−02 |

| surface number | A14 | A16 | A18 | A20 |
|---|---|---|---|---|
| S1 | −9.5043E−01 | 3.7043E−01 | 0 | 0 |
| S2 | 9.4958E−01 | −2.6590E−01 | 0 | 0 |
| S3 | 2.7197E+00 | −1.1124E+00 | 0 | 0 |
| S4 | −1.1246E+00 | 2.7310E−01 | 0 | 0 |
| S5 | 5.8355E−01 | −3.3647E−01 | 0 | 0 |
| S6 | −7.9730E−01 | 2.1226E−01 | 0 | 0 |
| S7 | −8.2700E+00 | 6.9853E+00 | −3.3652E+00 | 6.9914E−01 |
| S8 | 7.1604E−02 | −1.3143E−02 | 1.1065E−03 | −1.6863E−05 |
| S9 | 1.2295E−02 | −1.6372E−03 | 1.2109E−04 | −3.8348E−06 |
| S10 | 5.9140E−03 | −7.9065E−04 | 5.9498E−05 | −1.9122E−06 |

TABLE 30

| | | | |
|---|---|---|---|
| f1(mm) | 9.20 | f(mm) | 3.49 |
| f2(mm) | 3.56 | TTL(mm) | 4.28 |
| f3(mm) | −8.75 | HFOV(deg) | 40.5 |
| f4(mm) | 77.31 | | |
| f5(mm) | −14.01 | | |

Figure 20A:
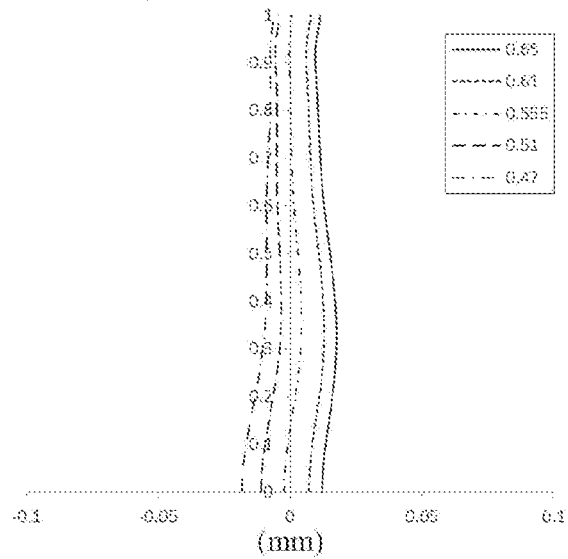
FIG. 20A illustrates a longitudinal aberration curve of the optical imaging system according to Embodiment 10.
Figure 20B:
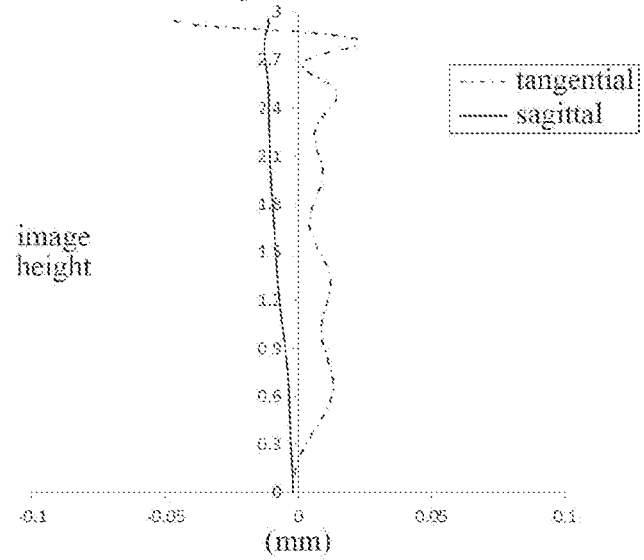
FIG. 20B illustrates an astigmatic curve of the optical imaging system according to Embodiment 10.
Figure 20C:
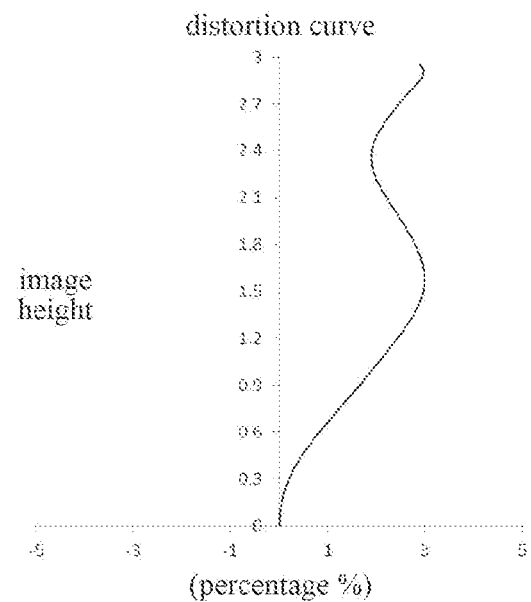
FIG. 20C illustrates a distortion curve of the optical imaging system according to Embodiment 10.
Figure 20D:
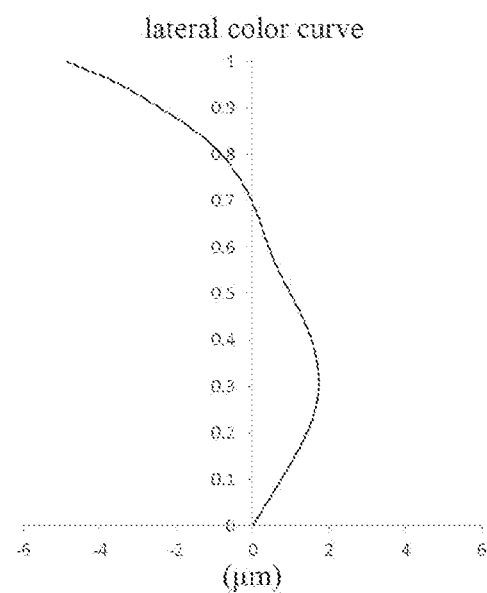
FIG. 20D illustrates a lateral color curve of the optical imaging system according to Embodiment 10.

FIG. 20A illustrates a longitudinal aberration curve of the optical imaging system according to Embodiment 10, representing deviations of focal points of light of different wavelengths converged after passing through an optical system. FIG. 20B illustrates an astigmatic curve of the optical imaging system according to Embodiment 10, representing a curvature of a tangential image plane and a curvature of a sagittal image plane. FIG. 20C illustrates a distortion curve of the optical imaging system according to Embodiment 10, representing amounts of distortion at different viewing angles. FIG. 20D illustrates a lateral color curve of the optical imaging system according to Embodiment 10, representing deviations of different image heights on an image plane after light passes through the optical imaging system. It can be seen according to FIGS. 20A-20D that the optical imaging system provided in Embodiment 10 achieves a good image quality.

Embodiment 11

Figure 21:
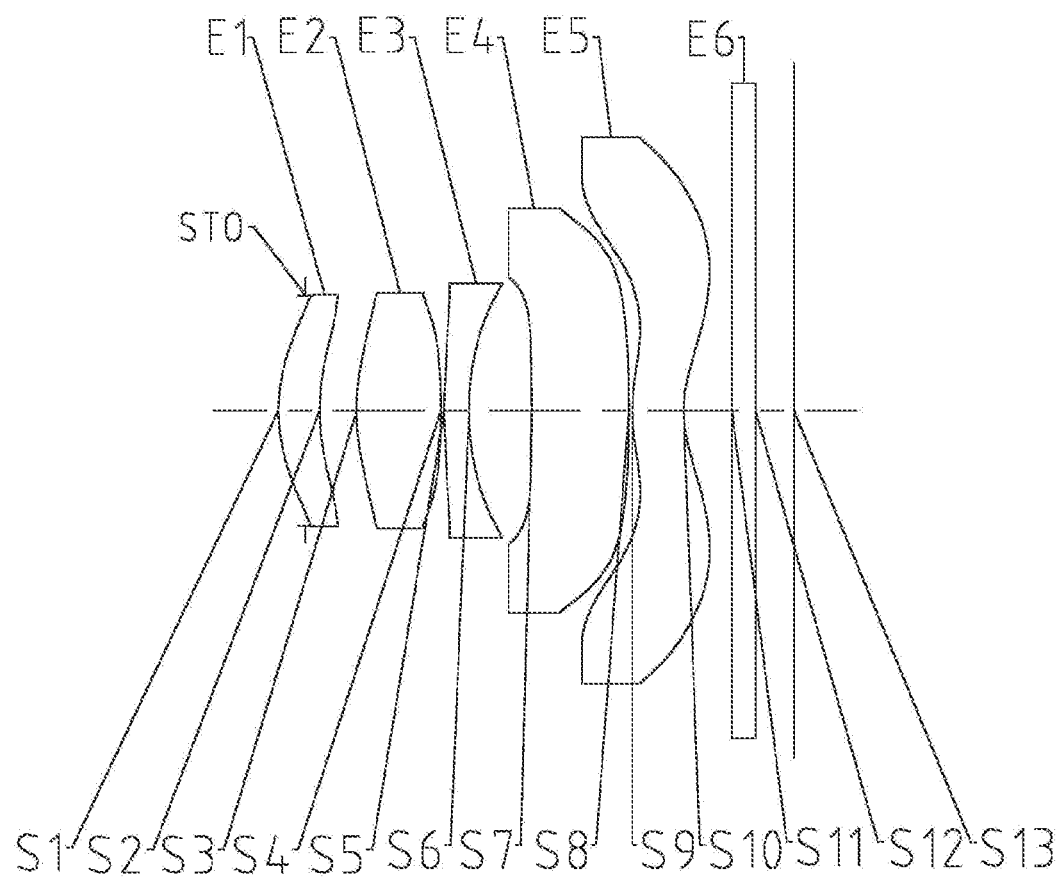
FIG. 21 is a schematic structural diagram illustrating an optical imaging system according to Embodiment 11 of the present disclosure.

An optical imaging system according to Embodiment 11 of the present disclosure is described below with reference to FIGS. 21-22D. FIG. 21 is a schematic structural diagram illustrating the optical imaging system according to Embodiment 11.

As shown in FIG. 21, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 31 shows the surface type, the radius of curvature, the thickness, the material and the conic coefficient of each lens in Embodiment 11. Table 32 shows the high-order coefficients of each mirror surface in Embodiment 11. Table 33 shows the effective focal lengths f1-f5 of the lenses, the total effective focal length f of the optical imaging system, the total track length TTL of the camera lens and the half of the field-of-view HFOV in Embodiment 11.

TABLE 31

| surface number | surface type | radius of curvature | thickness | material | conic coefficient |
|---|---|---|---|---|---|
| OBJ | spherical | infinite | infinite | | |
| STO | spherical | infinite | −0.2393 | | |
| S1 | aspheric | 1.5764 | 0.3662 | 1.54, 56.1 | −7.7699 |
| S2 | aspheric | 1.9894 | 0.3293 | | −7.6437 |
| S3 | aspheric | 2.1863 | 0.7502 | 1.54, 56.1 | −8.4743 |
| S4 | aspheric | −7.2799 | 0.0300 | | −87.6338 |
| S5 | aspheric | 5.9212 | 0.2200 | 1.66, 20.4 | 18.1750 |
| S6 | aspheric | 2.5388 | 0.5601 | | −12.6911 |
| S7 | aspheric | −15.6695 | 0.8631 | 1.64, 23.5 | 13.3405 |
| S8 | aspheric | −17.1950 | 0.0300 | | −99.0000 |
| S9 | aspheric | 1.5879 | 0.4565 | 1.54, 56.1 | −9.0721 |
| S10 | aspheric | 1.1008 | 0.4298 | | −2.2362 |
| S11 | spherical | infinite | 0.2100 | 1.52, 64.2 | |
| S12 | spherical | infinite | 0.3424 | | |
| S13 | spherical | infinite | | | |

TABLE 32

| surface number | A4 | A6 | A8 | A10 | A12 |
|---|---|---|---|---|---|
| S1 | 2.0542E−01 | −2.5890E−01 | 2.2717E−01 | −1.4904E−01 | 2.7159E−02 |
| S2 | 6.1603E−02 | −1.1470E−01 | −1.8012E−02 | 1.4104E−01 | −2.3263E−01 |
| S3 | 5.6650E−02 | −7.4564E−02 | −7.9394E−02 | 2.5862E−01 | −4.3350E−01 |

TABLE 32-continued

| | | | | | |
|---|---|---|---|---|---|
| S4 | −1.0543E−01 | −8.3562E−02 | 3.6122E−01 | −7.5594E−01 | 8.6964E−01 |
| S5 | −6.4200E−02 | −7.0035E−02 | 3.0643E−01 | −5.3762E−01 | 5.3490E−01 |
| S6 | 1.1897E−01 | −1.6468E−01 | 3.8615E−01 | −5.9137E−01 | 5.7067E−01 |
| S7 | 5.2063E−02 | −1.1033E−01 | −1.7695E−01 | 9.0892E−01 | −1.7766E+00 |
| S8 | −8.7205E−02 | 1.6430E−01 | −2.3163E−01 | 2.1826E−01 | −1.4956E−01 |
| S9 | −2.4204E−01 | 4.5527E−02 | 9.9223E−02 | −1.2240E−01 | 6.7396E−02 |
| S10 | −2.9823E−01 | 2.2592E−01 | −1.2986E−01 | 5.3589E−02 | −1.5865E−02 |

| surface number | A14 | A16 | A18 | A20 |
|---|---|---|---|---|
| S1 | 7.6326E−03 | 1.2753E−03 | 0 | 0 |
| S2 | 1.7634E−01 | −4.3443E−02 | 0 | 0 |
| S3 | 3.7754E−01 | −1.1520E−01 | 0 | 0 |
| S4 | −5.0022E−01 | 1.1716E−01 | 0 | 0 |
| S5 | −2.6381E−01 | 4.2170E−02 | 0 | 0 |
| S6 | −3.0829E−01 | 6.7648E−02 | 0 | 0 |
| S7 | 1.9007E+00 | −1.1570E+00 | 3.6859E−01 | −4.7140E−02 |
| S8 | 6.9828E−02 | −2.0586E−02 | 3.4125E−03 | −2.3999E−04 |
| S9 | −2.0534E−02 | 3.5683E−03 | −3.3201E−04 | 1.2853E−05 |
| S10 | 3.2703E−03 | −4.3673E−04 | 3.3258E−05 | −1.0798E−06 |

TABLE 33

| | | | |
|---|---|---|---|
| f1(mm) | 10.63 | f(mm) | 3.67 |
| f2(mm) | 3.18 | TTL(mm) | 4.59 |
| f3(mm) | −6.91 | HFOV(deg) | 39.0 |
| f4(mm) | −354.29 | | |
| f5(mm) | −9.85 | | |

Figure 22A:
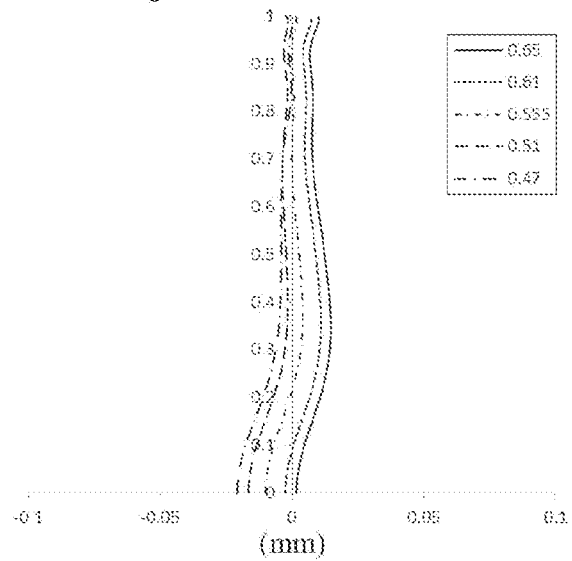
FIG. 22A illustrates a longitudinal aberration curve of the optical imaging system according to Embodiment 11.
Figure 22B:
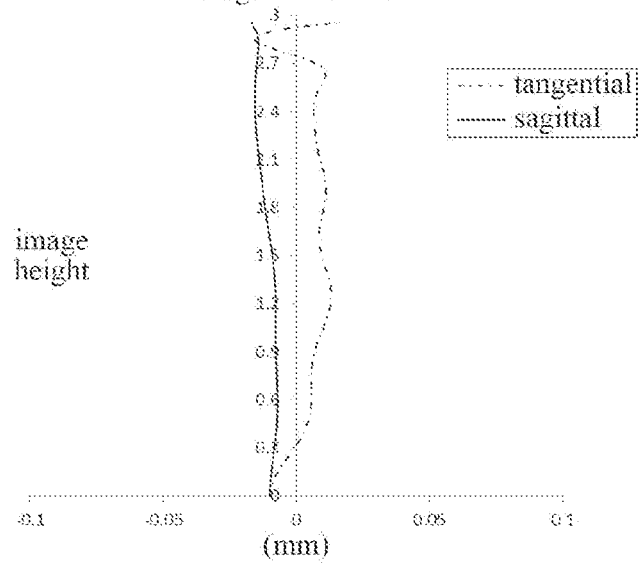
FIG. 22B illustrates an astigmatic curve of the optical imaging system according to Embodiment 11.
Figure 22C:
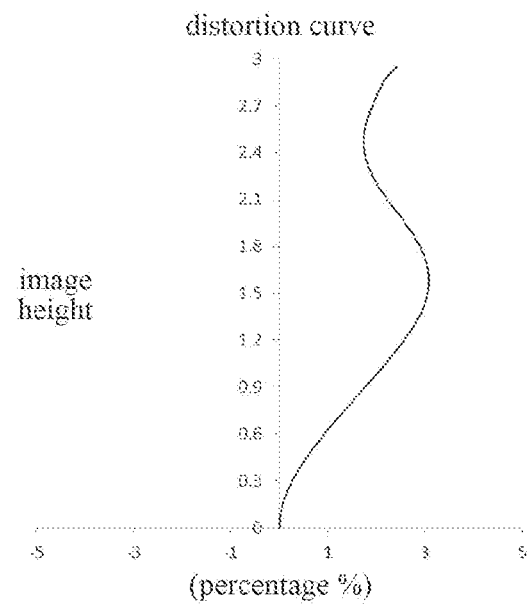
FIG. 22C illustrates a distortion curve of the optical imaging system according to Embodiment 11.
Figure 22D:
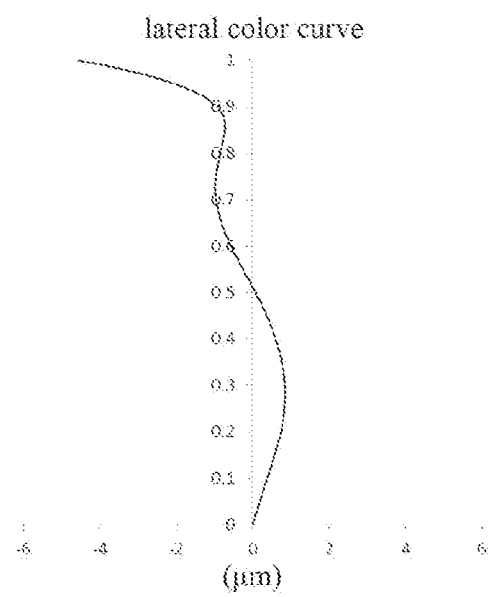
FIG. 22D illustrates a lateral color curve of the optical imaging system according to Embodiment 11.

FIG. 22A illustrates a longitudinal aberration curve of the optical imaging system according to Embodiment 11, representing deviations of focal points of light of different wavelengths converged after passing through an optical system. FIG. 22B illustrates an astigmatic curve of the optical imaging system according to Embodiment 11, representing a curvature of a tangential image plane and a curvature of a sagittal image plane. FIG. 22C illustrates a distortion curve of the optical imaging system according to Embodiment 11, representing amounts of distortion at different viewing angles. FIG. 22D illustrates a lateral color curve of the optical imaging system according to Embodiment 11, representing deviations of different image heights on an image plane after light passes through the optical imaging system. It can be seen according to FIGS. 22A-22D that the optical imaging system provided in Embodiment 11 achieves a good image quality.

Embodiment 12

Figure 23:
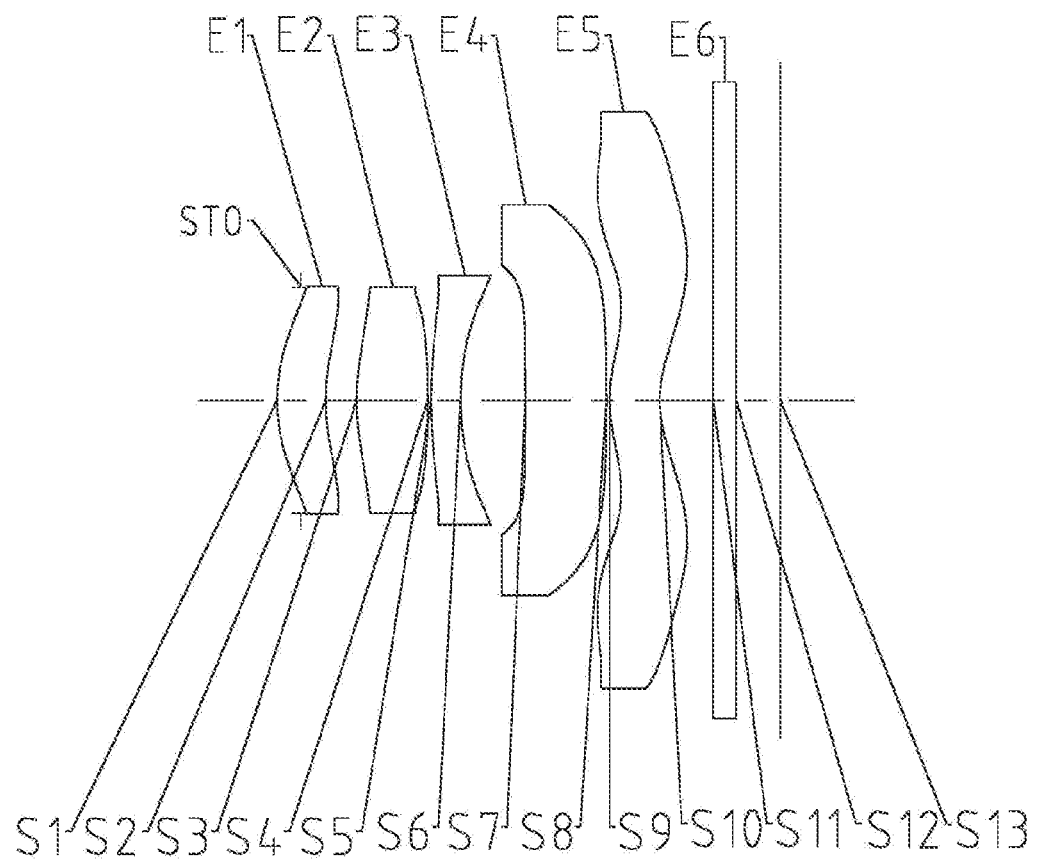
FIG. 23 is a schematic structural diagram illustrating an optical imaging system according to Embodiment 12 of the present disclosure.

An optical imaging system according to Embodiment 12 of the present disclosure is described below with reference to FIGS. 23-24D. FIG. 23 is a schematic structural diagram illustrating the optical imaging system according to Embodiment 12.

As shown in FIG. 23, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 34 shows the surface type, the radius of curvature, the thickness, the material and the conic coefficient of each lens in Embodiment 12. Table 35 shows the high-order coefficients of each mirror surface in Embodiment 12. Table 36 shows the effective focal lengths f1-f5 of the lenses, the total effective focal length f of the optical imaging system, the total track length TTL of the camera lens and the half of the field-of-view HFOV in Embodiment 12.

TABLE 34

| surface number | surface type | radius of curvature | thickness | material | conic coefficient |
|---|---|---|---|---|---|
| OBJ | spherical | infinite | infinite | | |
| STO | spherical | infinite | −0.2166 | | |
| S1 | aspheric | 1.6324 | 0.4445 | 1.54, 56.1 | −8.8932 |
| S2 | aspheric | 2.1214 | 0.2804 | | −12.3312 |
| S3 | aspheric | 2.4447 | 0.6490 | 1.54, 56.1 | −13.4936 |
| S4 | aspheric | −8.9697 | 0.0300 | | −87.6338 |
| S5 | aspheric | 4.8581 | 0.2675 | 1.66, 20.4 | 16.2009 |
| S6 | aspheric | 2.3890 | 0.5877 | | −13.2263 |
| S7 | aspheric | −24.7135 | 0.7409 | 1.64, 23.5 | 13.3405 |
| S8 | aspheric | infinite | 0.0300 | | −99.0000 |
| S9 | aspheric | 1.3012 | 0.4565 | 1.54, 56.1 | −6.3124 |
| S10 | aspheric | 1.0885 | 0.4884 | | −1.9965 |
| S11 | spherical | infinite | 0.2100 | 1.52, 64.2 | |
| S12 | spherical | infinite | 0.4025 | | |
| S13 | spherical | infinite | | | |

TABLE 35

| surface number | A4 | A6 | A8 | A10 | A12 |
|---|---|---|---|---|---|
| S1 | 2.1093E−01 | −3.0439E−01 | 3.2918E−01 | −3.1678E−01 | 2.0401E−01 |
| S2 | 8.2839E−02 | −2.4443E−01 | 2.1314E−01 | −2.3789E−01 | 1.8178E−01 |
| S3 | 6.1933E−02 | −1.8383E−01 | 1.9610E−01 | −3.5505E−01 | 3.4044E−01 |
| S4 | −3.5969E−02 | −1.9573E−01 | 4.9080E−01 | −8.8766E−01 | 1.0049E+00 |

TABLE 35-continued

| | | | | |
|---|---|---|---|---|
| S5 | −4.9678E−02 | −3.5334E−02 | 9.8907E−03 | 2.0164E−01 | −4.2264E−01 |
| S6 | 1.1097E−01 | −1.2268E−01 | 2.1733E−01 | −2.8842E−01 | 2.7430E−01 |
| S7 | 8.7998E−02 | −1.9587E−01 | 4.6556E−02 | 4.0447E−01 | −1.0028E+00 |
| S8 | −1.2844E−01 | 2.9529E−01 | −4.6552E−01 | 4.3881E−01 | −2.6670E−01 |
| S9 | −2.4041E−01 | 1.5186E−01 | −1.3115E−01 | 9.1713E−02 | −3.7603E−02 |
| S10 | −2.8200E−01 | 1.9086E−01 | −1.0195E−01 | 3.9366E−02 | −1.0573E−02 |

| surface number | A14 | A16 | A18 | A20 |
|---|---|---|---|---|
| S1 | −9.9588E−02 | 2.8880E−02 | 0 | 0 |
| S2 | −5.4025E−02 | 5.3547E−03 | 0 | 0 |
| S3 | −5.6513E−02 | −3.2198E−02 | 0 | 0 |
| S4 | −5.7210E−01 | 1.2410E−01 | 0 | 0 |
| S5 | 3.6455E−01 | −1.3268E−01 | 0 | 0 |
| S6 | −1.6395E−01 | 4.0616E−02 | 0 | 0 |
| S7 | 1.1603E+00 | −7.4096E−01 | 2.4572E−01 | −3.2579E−02 |
| S8 | 1.0464E−01 | −2.5543E−02 | 3.5186E−03 | −2.0838E−04 |
| S9 | 9.0739E−03 | −1.2880E−03 | 1.0014E−04 | −3.3040E−06 |
| S10 | 1.9464E−03 | −2.3446E−04 | 1.6513E−05 | −5.1069E−07 |

TABLE 36

| | | | |
|---|---|---|---|
| f1(mm) | 9.86 | f(mm) | 3.69 |
| f2(mm) | 3.60 | TTL(mm) | 4.59 |
| f3(mm) | −7.43 | HFOV(deg) | 39.0 |
| f4(mm) | −38.63 | | |
| f5(mm) | −50.16 | | |

Figure 24A:
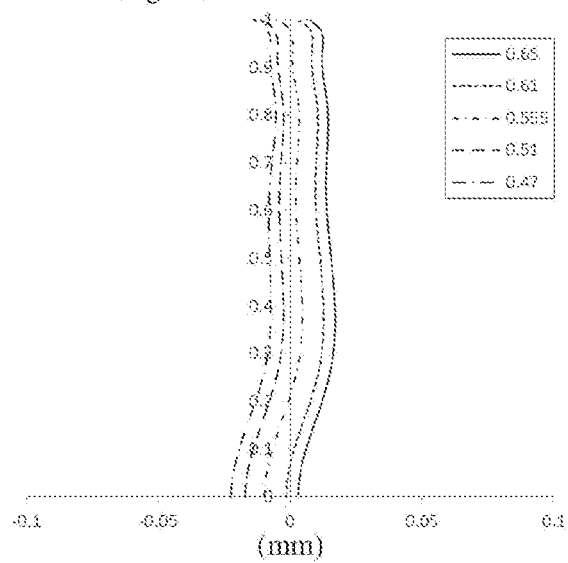
FIG. 24A illustrates a longitudinal aberration curve of the optical imaging system according to Embodiment 12.
Figure 24B:
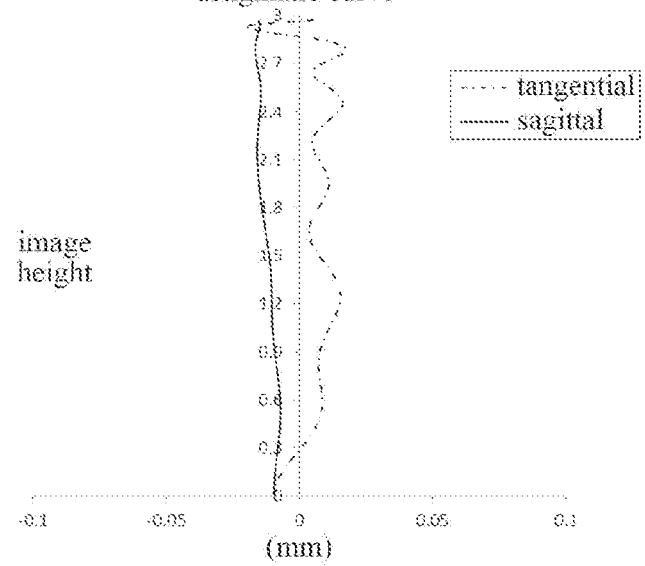
FIG. 24B illustrates an astigmatic curve of the optical imaging system according to Embodiment 12.
Figure 24C:
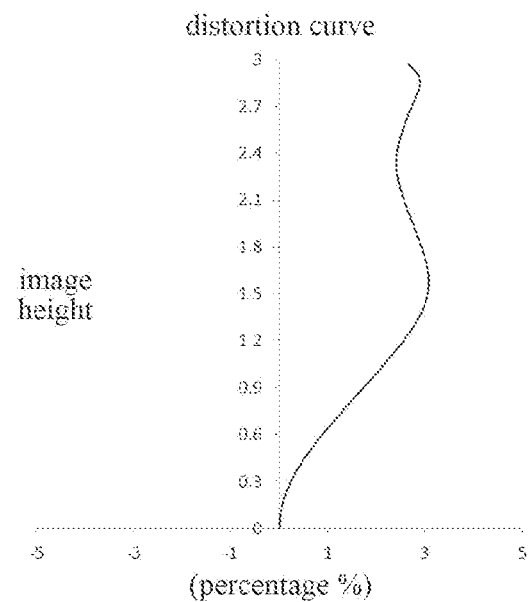
FIG. 24C illustrates a distortion curve of the optical imaging system according to Embodiment 12.
Figure 24D:
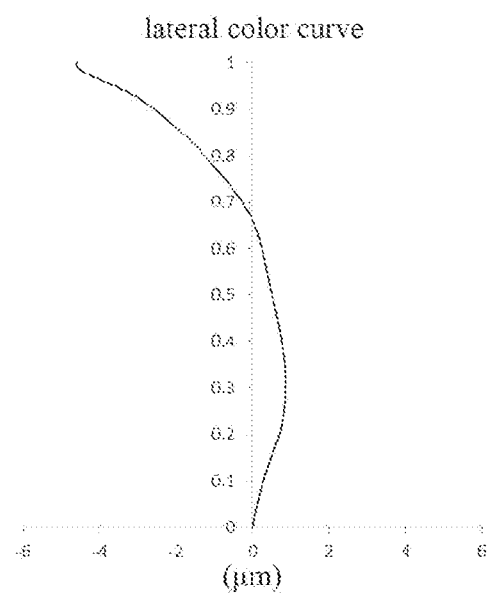
FIG. 24D illustrates a lateral color curve of the optical imaging system according to Embodiment 12.

FIG. 24A illustrates a longitudinal aberration curve of the optical imaging system according to Embodiment 12, representing deviations of focal points of light of different wavelengths converged after passing through an optical system. FIG. 24B illustrates an astigmatic curve of the optical imaging system according to Embodiment 12, representing a curvature of a tangential image plane and a curvature of a sagittal image plane. FIG. 24C illustrates a distortion curve of the optical imaging system according to Embodiment 12, representing amounts of distortion at different viewing angles. FIG. 24D illustrates a lateral color curve of the optical imaging system according to Embodiment 12, representing deviations of different image heights on an image plane after light passes through the optical imaging system. It can be seen according to FIGS. 24A-24D that the optical imaging system provided in Embodiment 12 achieves a good image quality.

Embodiment 13

Figure 25:
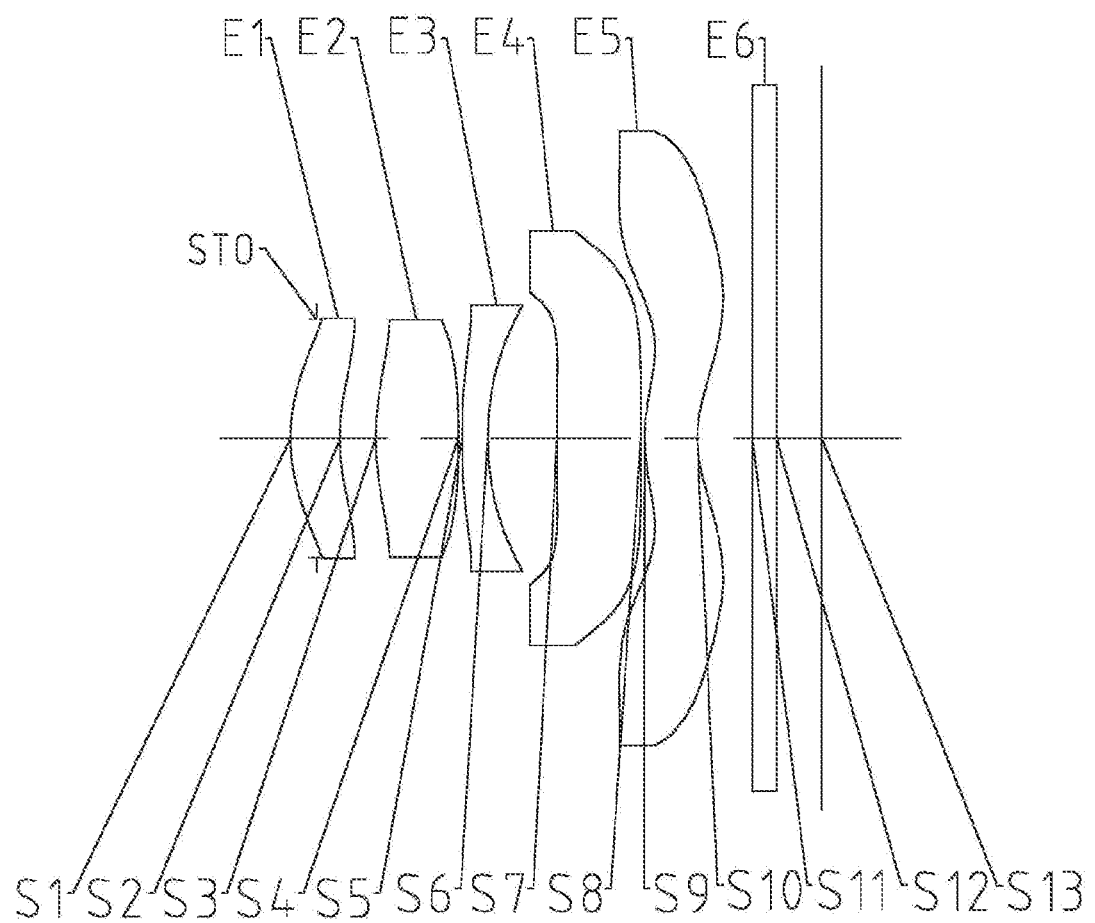
FIG. 25 is a schematic structural diagram illustrating an optical imaging system according to Embodiment 13 of the present disclosure.

An optical imaging system according to Embodiment 13 of the present disclosure is described below with reference to FIGS. 25-26D. FIG. 25 is a schematic structural diagram illustrating the optical imaging system according to Embodiment 13.

As shown in FIG. 25, the optical imaging system includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the optical imaging system may further include an optical filter E6 having an object-side surface S11 and an image-side surface S12 and used for filtering out infrared light. In the optical imaging system of this embodiment, an aperture STO may also be provided to adjust the amount of light admitted. Light from an object sequentially passes through the surfaces S1-S12 and finally forms an image on an image plane S13.

Table 37 shows the surface type, the radius of curvature, the thickness, the material and the conic coefficient of each lens in Embodiment 13. Table 38 shows the high-order coefficients of each mirror surface in Embodiment 13. Table 39 shows the effective focal lengths f1-f5 of the lenses, the total effective focal length f of the optical imaging system, the total track length TTL of the camera lens and the half of the field-of-view HFOV in Embodiment 13.

TABLE 37

| surface number | surface type | radius of curvature | thickness | material | conic coefficient |
|---|---|---|---|---|---|
| OBJ | spherical | infinite | infinite | | |
| STO | spherical | infinite | −0.2237 | | |
| S1 | aspheric | 1.6392 | 0.4281 | 1.54, 56.1 | −8.5406 |
| S2 | aspheric | 2.1277 | 0.3075 | | −10.9315 |
| S3 | aspheric | 2.3988 | 0.7152 | 1.54, 56.1 | −13.7887 |
| S4 | aspheric | −9.0892 | 0.0300 | | −87.6338 |
| S5 | aspheric | 4.8299 | 0.2227 | 1.66, 20.4 | 15.3814 |
| S6 | aspheric | 2.4195 | 0.5985 | | −11.8684 |
| S7 | aspheric | 1434.2319 | 0.7234 | 1.64, 23.5 | 13.3405 |
| S8 | aspheric | 29.8979 | 0.0300 | | −99.0000 |
| S9 | aspheric | 1.3984 | 0.4565 | 1.54, 56.1 | −8.1341 |
| S10 | aspheric | 1.1240 | 0.4758 | | −1.9983 |
| S11 | spherical | infinite | 0.2100 | 1.52, 64.2 | |
| S12 | spherical | infinite | 0.3899 | | |
| S13 | spherical | infinite | | | |

TABLE 38

| surface number | A4 | A6 | A8 | A10 | A12 |
|---|---|---|---|---|---|
| S1 | 1.9953E−01 | −2.8100E−01 | 3.2037E−01 | −3.4387E−01 | 2.6011E−01 |
| S2 | 6.5014E−02 | −1.7634E−01 | 1.0594E−01 | −6.8994E−02 | 7.4156E−03 |
| S3 | 6.2523E−02 | −1.5235E−01 | 6.8003E−02 | −4.4528E−03 | −1.3867E−01 |

TABLE 38-continued

| | | | | | |
|---|---|---|---|---|---|
| S4 | −1.5655E−01 | 3.7190E−01 | −9.1859E−01 | 1.1690E+00 | −8.1621E−01 |
| S5 | −1.5385E−01 | 4.7865E−01 | −1.0643E+00 | 1.4394E+00 | −1.2293E+00 |
| S6 | 7.2457E−02 | 9.6880E−03 | 7.2197E−02 | −2.5401E−01 | 3.2214E−01 |
| S7 | 8.0473E−02 | −2.6382E−01 | 5.3348E−01 | −1.2335E+00 | 2.1824E+00 |
| S8 | −9.0617E−02 | 2.0448E−01 | −4.0299E−01 | 4.5793E−01 | −3.2742E−01 |
| S9 | −1.9065E−01 | 1.2984E−02 | 6.3530E−03 | 1.8497E−02 | −1.3977E−02 |
| S10 | −2.8822E−01 | 1.8648E−01 | −9.5224E−02 | 3.5437E−02 | −9.0988E−03 |

| surface number | A14 | A16 | A18 | A20 |
|---|---|---|---|---|
| S1 | −1.3799E−01 | 3.7594E−02 | 0 | 0 |
| S2 | 3.0303E−02 | −8.7236E−03 | 0 | 0 |
| S3 | 2.2307E−01 | −8.8085E−02 | 0 | 0 |
| S4 | 3.1605E−01 | −5.5269E−02 | 0 | 0 |
| S5 | 6.2315E−01 | −1.5108E−01 | 0 | 0 |
| S6 | −1.9547E−01 | 4.5263E−02 | 0 | 0 |
| S7 | −2.5626E+00 | 1.8373E+00 | −7.2850E−01 | 1.2190E−01 |
| S8 | 1.4809E−01 | −4.1059E−02 | 6.3462E−03 | −4.1659E−04 |
| S9 | 4.3008E−03 | −6.9637E−04 | 5.8947E−05 | −2.0712E−06 |
| S10 | 1.5887E−03 | −1.8255E−04 | 1.2480E−05 | −3.8258E−07 |

TABLE 39

| | | | |
|---|---|---|---|
| f1(mm) | 10.03 | f(mm) | 3.69 |
| f2(mm) | 3.57 | TTL(mm) | 4.59 |
| f3(mm) | −7.62 | HFOV(deg) | 39.0 |
| f4(mm) | −47.74 | | |
| f5(mm) | −25.44 | | |

Figure 26A:
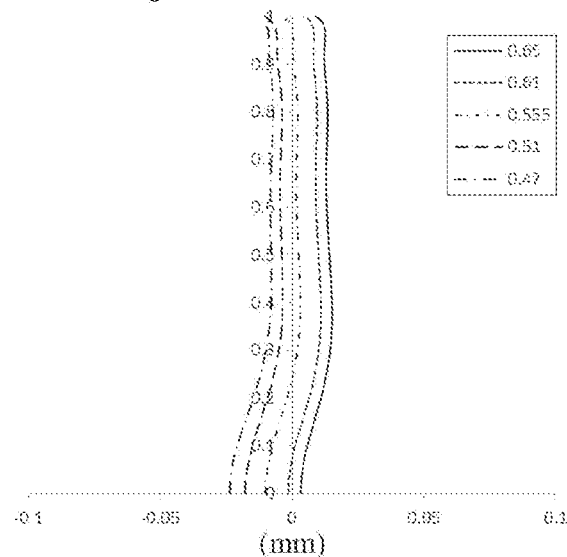
FIG. 26A illustrates a longitudinal aberration curve of the optical imaging system according to Embodiment 13.
Figure 26B:
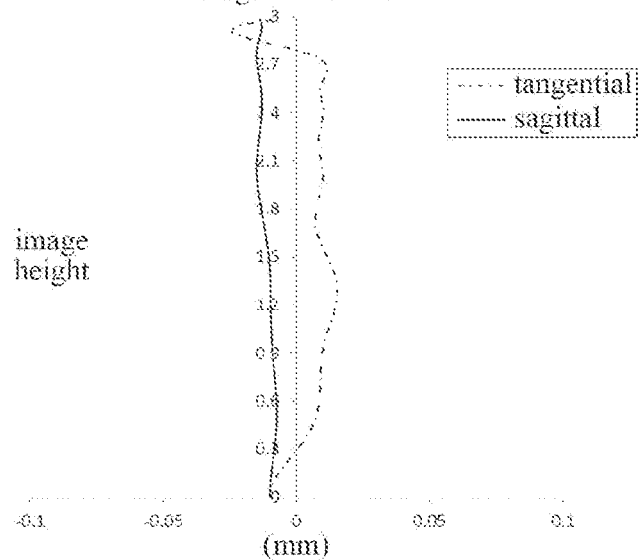
FIG. 26B illustrates an astigmatic curve of the optical imaging system according to Embodiment 13.
Figure 26C:
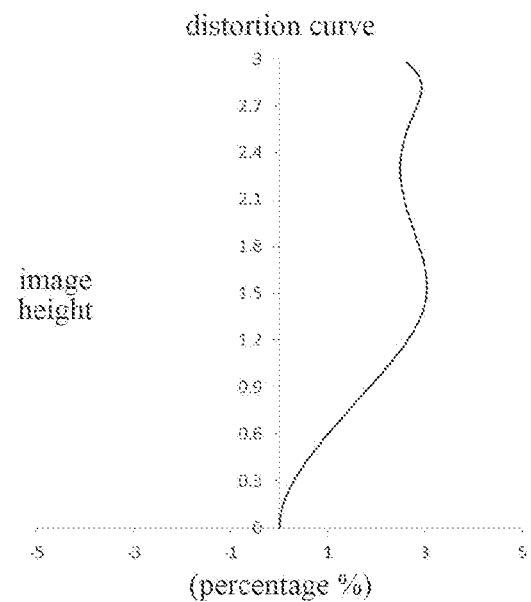
FIG. 26C illustrates a distortion curve of the optical imaging system according to Embodiment 13.
Figure 26D:
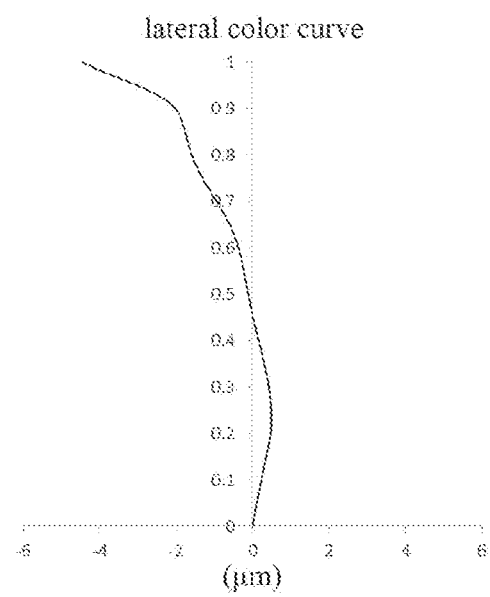
FIG. 26D illustrates a lateral color curve of the optical imaging system according to Embodiment 13.

FIG. 26A illustrates a longitudinal aberration curve of the optical imaging system according to Embodiment 13, representing deviations of focal points of light of different wavelengths converged after passing through an optical system. FIG. 26B illustrates an astigmatic curve of the optical imaging system according to Embodiment 13, representing a curvature of a tangential image plane and a curvature of a sagittal image plane. FIG. 26C illustrates a distortion curve of the optical imaging system according to Embodiment 13, representing amounts of distortion at different viewing angles. FIG. 26D illustrates a lateral color curve of the optical imaging system according to Embodiment 13, representing deviations of different image heights on an image plane after light passes through the optical imaging system. It can be seen according to FIGS. 26A-26D that the optical imaging system provided in Embodiment 13 achieves a good image quality.

To sum up, Embodiment 1 to Embodiment 13 respectively satisfy the relationships shown in Table 40 below.

TABLE 40

| Conditional expression | Embodiment | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| f/EPD | 1.78 | 1.83 | 1.78 | 1.78 | 1.78 | 1.78 | 1.78 | 1.78 | 1.93 | 2.00 | 1.78 | 1.78 | 1.78 |
| f/f1 | 0.38 | 0.39 | 0.46 | 0.34 | 0.34 | 0.39 | 0.38 | 0.38 | 0.39 | 0.38 | 0.35 | 0.37 | 0.37 |
| (R5 − R6)/(R5 + R6) | 0.29 | 0.27 | 0.37 | 0.42 | 0.45 | 0.44 | 0.33 | 0.33 | 0.27 | 0.27 | 0.40 | 0.34 | 0.33 |
| f12/f3 | −0.34 | −0.33 | −0.40 | −0.41 | −0.42 | −0.46 | −0.38 | −0.38 | −0.33 | −0.32 | −0.39 | −0.39 | −0.38 |
| |V3 − V4| | 3.10 | 3.10 | 3.10 | 3.10 | 3.10 | 3.10 | 3.10 | 3.10 | 3.10 | 3.10 | 3.10 | 3.10 | 3.10 |
| f2/|R4| | 0.33 | 0.31 | 0.56 | 0.45 | 0.49 | 0.45 | 0.40 | 0.40 | 0.31 | 0.31 | 0.44 | 0.40 | 0.39 |
| R5/R4 | −0.38 | −0.35 | −0.78 | −0.87 | −1.06 | −0.85 | −0.53 | −0.53 | −0.35 | −0.35 | −0.81 | −0.54 | −0.53 |
| f/|R7| | 0.46 | 0.51 | 0.01 | 0.24 | 0.24 | 0.21 | 0.01 | 0.00 | 0.51 | 0.59 | 0.23 | 0.15 | 0.003 |
| T34/TTL | 0.12 | 0.12 | 0.18 | 0.12 | 0.12 | 0.13 | 0.13 | 0.13 | 0.12 | 0.13 | 0.12 | 0.13 | 0.13 |
| CT3/CT4 | 0.31 | 0.31 | 0.31 | 0.26 | 0.26 | 0.27 | 0.36 | 0.36 | 0.31 | 0.32 | 0.25 | 0.36 | 0.31 |
| f/f45 | −0.12 | −0.16 | −0.12 | −0.37 | −0.37 | −0.32 | −0.23 | −0.23 | −0.16 | −0.21 | −0.39 | −0.18 | −0.23 |

The present disclosure further provides a camera device, having a photosensitive element which may be a photosensitive charge-coupled device (CCD) or complementary metal-oxide semiconductor (CMOS) element. The camera device may be an independent camera device, such as a digital camera, or may be a camera module integrated in a mobile electronic device, such as a mobile phone. The camera device is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system comprising sequentially, from an object side to an image side along an optical axis, a first lens assembly having a positive refractive power, a second lens assembly having a negative refractive power and at least one subsequent lens assembly,
    wherein the first lens assembly comprises a first lens and a second lens having positive refractive powers;
    the second lens assembly comprises a third lens having a negative refractive power;
    the at least one subsequent lens assembly comprises a third lens assembly having a negative refractive power, and the third lens assembly comprises a fourth lens having a refractive power; and
    an image-side surface of the first lens gradually changes from a concave surface to a convex surface as the image-side surface moves away from the optical axis, wherein a center thickness CT3 of the third lens and a center thickness CT4 of the fourth lens satisfy: CT3/CT4≤0.4.

2. The optical imaging system according to claim 1, wherein a combined focal length f12 of the first lens and the second lens and an effective focal length f3 of the third lens satisfy: −0.5<f12/f3<0.

3. The optical imaging system according to claim 1, wherein an object-side surface and an image-side surface of the second lens are convex surfaces.

4. The optical imaging system according to claim 1, wherein a total effective focal length f of the optical imaging system and an entrance pupil diameter EPD of the optical imaging system satisfy: f/EPD≤2.0.

5. The optical imaging system according to claim 1, wherein an effective focal length f1 of the first lens and a total effective focal length f of the optical imaging system satisfy: 0.3≤f/f1≤0.5.

6. The optical imaging system according to claim 1, wherein an effective focal length f2 of the second lens and a radius of curvature R4 of an image-side surface of the second lens satisfy: f2/|R4|≤0.6.

7. The optical imaging system according to claim 1, wherein a radius of curvature R5 of an object-side surface of the third lens and a radius of curvature R6 of an image-side surface of the third lens satisfy: 0<(R5−R6)/(R5+R6)<0.5.

8. The optical imaging system according to claim 1, wherein a radius of curvature R4 of an image-side surface of the second lens and a radius of curvature R5 of an object-side surface of the third lens satisfy: −1.2<R5/R4<0.

9. The optical imaging system according to claim 1, wherein an abbe number V3 of the third lens and an abbe number V4 of the fourth lens satisfy: |V3−V4|≤10.

10. The optical imaging system according to claim 1, wherein a radius of curvature R7 of an object-side surface of the fourth lens and the total effective focal length f of the optical imaging system satisfy: f/|R7|≤0.6.

11. The optical imaging system according to claim 1, wherein a spacing distance T34 between the third lens and the fourth lens on the optical axis and an axial distance TTL from an object-side surface of the first lens to an image plane of the optical imaging system satisfy: T34/TTL<0.2.

12. The optical imaging system according to claim 1, wherein the third lens assembly further comprises a fifth lens having a refractive power,
    wherein an object-side surface of the fifth lens is a convex surface at a paraxial position, and an image-side surface of the fifth lens is a concave surface at a paraxial position.

13. The optical imaging system according to claim 12, wherein a combined focal length f45 of the fourth lens and the fifth lens and the total effective focal length f of the optical imaging system satisfy: −0.5<f/f45<0.

14. A camera device, comprising the optical imaging system according to claim 1.

* * * * *